(12) United States Patent
Fukushi et al.

(10) Patent No.: US 11,066,321 B2
(45) Date of Patent: Jul. 20, 2021

(54) MOLD, MOLDING APPARATUS, PRODUCTION METHOD OF MOLDED BODY, AND MOLDED BODY

(71) Applicant: AGC INC., Chiyoda-ku (JP)

(72) Inventors: Takanori Fukushi, Tokyo (JP); Satoshi Kanasugi, Tokyo (JP); Masao Ozeki, Tokyo (JP)

(73) Assignee: AGC INC., Chiyoda-ku (JP)

( * ) Notice: Subject to any disclaimer, the term of this patent is extended or adjusted under 35 U.S.C. 154(b) by 250 days.

(21) Appl. No.: 16/184,271

(22) Filed: Nov. 8, 2018

(65) Prior Publication Data
US 2019/0135677 A1 May 9, 2019

(30) Foreign Application Priority Data

Nov. 9, 2017 (JP) .............................. JP2017-216459

(51) Int. Cl.
| | | |
|---|---|---|
| C03C 3/00 | (2006.01) | |
| C03B 23/03 | (2006.01) | |
| C03B 25/08 | (2006.01) | |
| C03C 3/087 | (2006.01) | |
| C03B 29/08 | (2006.01) | |
| C03C 12/00 | (2006.01) | |
| C03B 40/00 | (2006.01) | |
| C03C 3/091 | (2006.01) | |

(52) U.S. Cl.
CPC ...... *C03B 23/0302* (2013.01); *C03B 23/0307* (2013.01); *C03B 25/08* (2013.01); *C03B 29/08* (2013.01); *C03B 40/00* (2013.01); *C03C 3/00* (2013.01); *C03C 3/087* (2013.01); *C03C 3/091* (2013.01); *C03C 12/00* (2013.01); *C03B 2215/50* (2013.01); *C03B 2225/02* (2013.01); *Y10T 428/24264* (2015.01)

(58) Field of Classification Search
None
See application file for complete search history.

(56) References Cited

U.S. PATENT DOCUMENTS

| | | |
|---|---|---|
| 9,650,278 B2 | 5/2017 | Funatsu et al. |
| 2015/0353410 A1 | 12/2015 | Funatsu et al. |

FOREIGN PATENT DOCUMENTS

| | | |
|---|---|---|
| CN | 205528401 U | 8/2016 |
| CN | 206109196 U | 4/2017 |
| CN | 206188643 U | 5/2017 |

(Continued)

*Primary Examiner* — Alexander S Thomas
(74) *Attorney, Agent, or Firm* — Oblon, McClelland, Maier & Neustadt, L.L.P.

(57) ABSTRACT

The present invention relates to a mold including a master mold having a first region master mold molding surface having a shape corresponding to a first region of a molded body, and a second region master mold molding surface having a shape corresponding to a second region of the molded body, and in which the master mold includes: an inner mold having the first region master mold molding surface; an outer mold having an accommodating concave portion capable of accommodating the inner mold therein and the second region master mold molding surface on at least a part of an outer edge of the accommodating concave portion; and a buffer material provided between the inner mold and a bottom surface of the accommodating concave portion, the buffer material being pressed and deformed with relative movement of the inner mold and the outer mold.

4 Claims, 17 Drawing Sheets

(56) References Cited

FOREIGN PATENT DOCUMENTS

| | | |
|---|---|---|
| JP | 2012-148957 A | 8/2012 |
| JP | 2017-528406 A | 9/2017 |
| WO | WO 2014/097830 A1 | 6/2014 |
| WO | WO 2016/032005 A1 | 3/2016 |

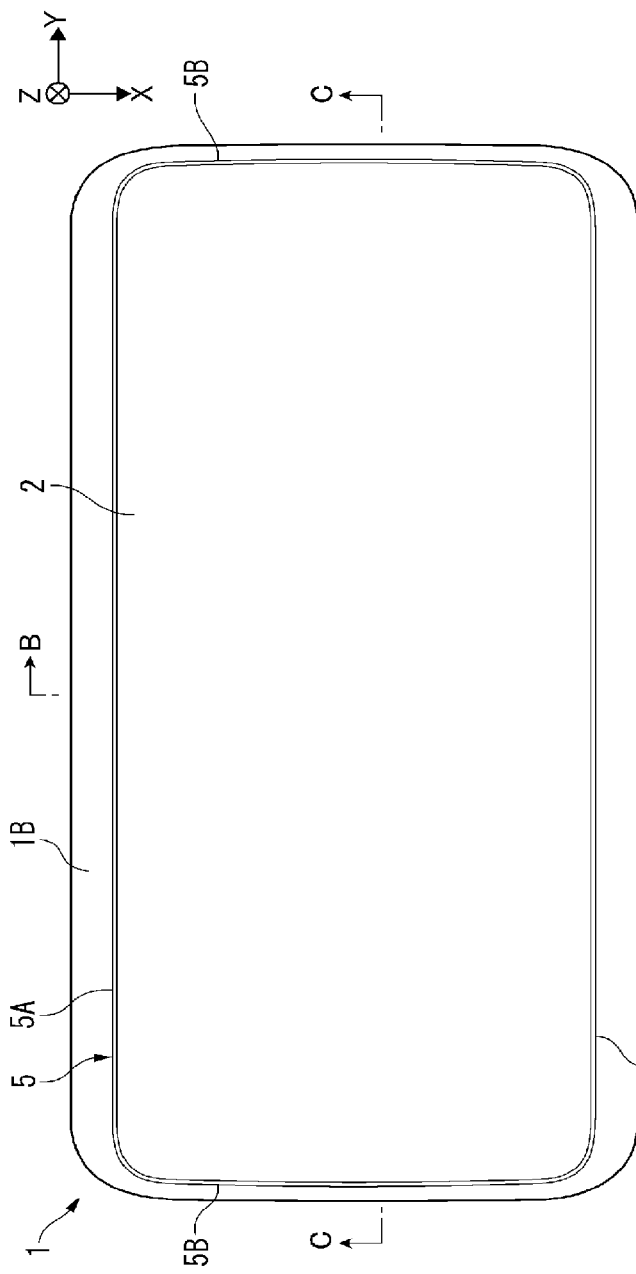
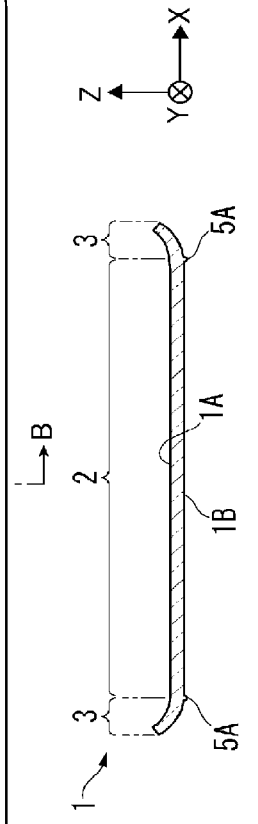
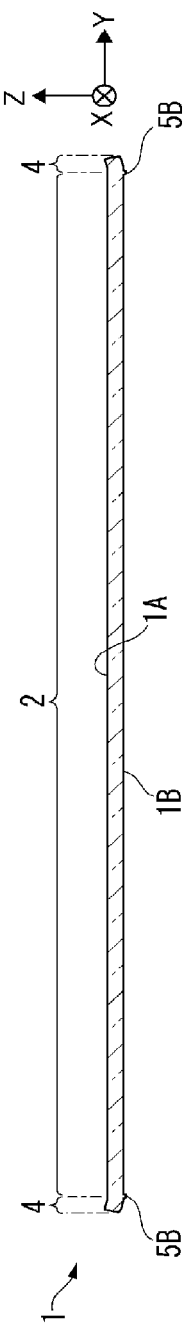
FIG. 1A
FIG. 1B
FIG. 1C

MOLD, MOLDING APPARATUS, PRODUCTION METHOD OF MOLDED BODY, AND MOLDED BODY

FIELD OF THE INVENTION

The present invention relates to a mold, a molding apparatus, a production method of a molded body, and a molded body.

BACKGROUND OF THE INVENTION

In recent years, there is investigated a method in which a glass material accommodated within a mold having an auxiliary mold and a master mold is heat-softened and pressed, thereby producing a glass-made press molded body (see, for example, Patent Document 1).

Patent Document 1 discloses a configuration in which a gap formed by the respective molding surfaces of an auxiliary mold (upper mold) and a master mold (lower mold) is formed so as to become wider from an inner side toward an outer side of the molding surfaces.

Patent Document 1: WO 2014/097830

SUMMARY OF THE INVENTION

However, according to the configuration as in Patent Document 1, the pressing is commenced in a state where the flat plate-like glass material before molding is placed on the periphery of the molding surface of the master mold, and the glass material is floated from the molding surface of the master mold. Therefore, when the glass material is softened by heating, the central portion that is to become a flat portion is bent downward due to its own weight. When the auxiliary mold is allowed to fall down in this state, thereby pressing the glass material, there is a concern that a wrinkle is generated on the boundary between the flat portion and the bent portion in the glass material.

In view of the foregoing problem, the present invention has been made, and an object thereof is to provide a mold in which a wrinkle is hardly generated in a molded body, a molding apparatus, a production method of a molded body, and a molded body in which generation of a wrinkle is suppressed.

A mold according to the present invention is a mold for obtaining a plate-like molded body having a first region and a second region provided on at least a part of an outer edge of the first region by molding a flat plate-like molding material, a radius of curvature of the second region being smaller than a radius of curvature of the first region, in which the mold includes a master mold having a first region master mold molding surface having a shape corresponding to the first region, and a second region master mold molding surface having a shape corresponding to the second region, and the master mold includes: an inner mold having the first region master mold molding surface; an outer mold having an accommodating concave portion capable of accommodating the inner mold therein and the second region master mold molding surface on at least a part of an outer edge of the accommodating concave portion; and a buffer material provided between the inner mold and a bottom surface of the accommodating concave portion, the buffer material being pressed and deformed with relative movement of the inner mold and the outer mold.

According to the present invention, a molded body is obtained by the following method.

First of all, an inner mold and an outer mold are relatively moved in a state where a second main surface of a flat plate-like molding material comes into contact with a first region master mold molding surface of a master mold. According to this relative movement, a buffer material is deformed while maintaining the state where the molding material comes into contact with the first region master mold molding surface of the master mold, to accommodate the inner mold in an accommodating concave portion of the outer mold, whereby molding is performed by making a portion of the molding material not coming into contact with the first region master mold molding surface of the master mold along a second region master mold molding surface of the master mold, thereby obtaining a molded body having a first region and a second region formed on an outer edge of the first region.

In this way, by performing molding while allowing the first region where it is intended to obtain a desired design shape or optical characteristics to always come into contact with the first region master mold molding surface of the master mold, bending of the portion serving as the first region during molding can be suppressed, and generation of a wrinkle to be caused due to this bending on the boundary between the first region and the second region can be suppressed.

In the mold according to the present invention, it is preferred that the mold further includes an auxiliary mold which has a first region auxiliary mold molding surface having a shape corresponding to the first region of the molded body and a second region auxiliary mold molding surface having a shape corresponding to the second region of the molded body, and that the molding is press molding.

According to the present invention, the molded body is obtained by the following method.

First of all, the auxiliary mold and the master mold are relatively moved in a state where a first main surface of a flat plate-like molding material comes into contact with a first region auxiliary mold molding surface of the auxiliary mold, and a second main surface thereof comes into contact with the first region master mold molding surface of the master mold. According to this, the buffer material is deformed while maintaining the state where the molding material comes into contact with the first region auxiliary mold molding surface and the first region master mold molding surface, to accommodate the inner mold in the accommodating concave portion of the outer mold, whereby a portion of the molding material not coming into contact with the first region master mold molding surface is pressed by the second region master mold molding surface and the second region auxiliary mold molding surface, and then the molded body having the first region and the second region can be molded.

In this way, by performing press molding while allowing a portion serving as the first region to always come into contact with the first region auxiliary mold molding surface of the auxiliary mold and the first region master mold molding surface of the master mold, bending of the portion serving as the first region during press molding can be suppressed, and generation of a wrinkle to be caused due to this bending on the boundary between the first region and the second region can be suppressed.

In the mold according to the present invention, it is preferred that the auxiliary mold is an upper mold; and that the master mold is a lower mold.

In this embodiment of the present invention, by using the master mold as the lower mold, it becomes easy to place the buffer material and the inner mold within the accommodating concave portion of the outer mold.

In the mold according to the present invention, it is preferred that a buffer material-positioning portion for positioning the buffer material is provided on the bottom surface of the accommodating concave portion.

In this embodiment of the present invention, a positioning work of the buffer material becomes easy. In addition, a position deviation in the direction orthogonal to the pressurization direction of the buffer material during molding can be suppressed, and a high-quality molded body is obtained.

In the mold according to the present invention, it is preferred that the buffer material-positioning portion has an inner positioning concave portion concaved so as to accommodate a part of the buffer material therein; and an outer positioning concave portion concaved more shallowly than the inner positioning concave portion, the outer positioning concave portion being provided on a periphery of the inner positioning concave portion.

In this embodiment of the present invention, the buffer material is put into the outer positioning concave portion to substantially perform the positioning, and a part of the buffer material is then accommodated in the inner positioning concave portion, whereby the precise positioning of the buffer material can be easily achieved. In addition, the buffer material is deformed through molding, and the deformed portion comes into the inner positioning concave portion. Then, when the molding is advanced, a portion which has not come into the inner positioning concave portion expands outside centering on the inner positioning concave portion within the outer positioning accommodating concave portion and reaches an outer edge of the outer positioning concave portion, whereby the expansion is controlled. According to this control of expansion, the deformation of the buffer material is controlled, too, a deformation quantity of the buffer material becomes always constant, and the molded state is stabilized.

In the mold according to the present invention, it is preferred that the first region of the molded body has a polygonal shape in planar view; and that the buffer material is provided in a position corresponding to each of corner portions of the first region.

In this embodiment of the present invention, by providing the buffer material in a position corresponding to each of corner portions of the first region where a wrinkle is liable to be especially generated, bending of the inner mold in the respective corner portion can be suppressed. In consequence, the generation of a wrinkle is controlled, and the quality of the molded body is enhanced. The corner of the "polygonal shape" may be either pointed or round.

In the mold according to the present invention, it is preferred that the accommodating concave portion has a through-hole penetrating in a direction of the relative movement of the inner mold and the outer mold.

In this embodiment of the present invention, after molding, by inserting a pin, etc. into the through-hole of the accommodating concave portion to press the inner mold, it is easy to take away the inner mold and the molded body from the outer mold.

In the mold according to the present invention, it is preferred that a buffer material pressurizing surface of the inner mold, positioning on an opposite side to the first region master mold molding surface, is planar, and the buffer material is spherical.

In this embodiment of the present invention, a contact area of the buffer material pressurizing surface with the buffer material can be suppressed to the minimum. In consequence, a difference in temperature between a portion coming into contact with the buffer material and a portion not coming into contact with the buffer material in the inner mold can be suppressed to the minimum, and molding unevenness of the flat portion in the molded body can be suppressed.

In the mold according to the present invention, it is preferred that the buffer material is plastically deformed through pressurization.

In this embodiment of the present invention, an effect in which degradation of surface roughness to be caused due to the matter that the molded body sandwiched by the mold by an elastic force of the buffer material is strongly compressed during press molding is lightened, is obtained.

In the mold according to the present invention, it is preferred that the buffer material is made of a glass.

In this embodiment of the present invention, when a glass that is easy for availability or processing and low in costs is used as the buffer material, it is disposable or easy to be reused.

In the mold according to the present invention, it is preferred that the molding material is made of a glass; and that at an annealing point of the molding material, a logarithm $\log_{10}(\eta/\eta_0)$ of a ratio of an equilibrium viscosity $\eta$ (Pa·s) of the molding material to an equilibrium viscosity $\eta_0$ (Pa·s) of the buffer material is 1 or more and 5 or less.

In this embodiment of the present invention, the molding material can be molded in such a manner that flatness of a site where it is intended to keep the flatness can be kept while maintaining optical characteristics.

In the mold according to the present invention, it is preferred that a coefficient of thermal conductivity of the buffer material is 0.1 W/(m·K) or more and 1.5 W/(m·K) or less.

In this embodiment of the present invention, by performing molding without extremely raising the temperature of the first region of the molded body as compared with the second region, an effect for lightening degradation of surface roughness is obtained.

A molding apparatus according to the present invention includes the above-described mold and a pressurizing portion of applying a pressure so as to accommodate the inner mold configuring the master mold of the mold in the accommodating concave portion.

A production method of a molded body according to the present invention is a method for producing a molded body with the above-described molding apparatus, the method including:

applying a pressure so as to accommodate the inner mold in the accommodating concave portion by the pressurizing portion in a state where a second main surface of a flat plate-like molding material comes into contact with the first region master mold molding surface of the master mold, and deforming the buffer material while maintaining the state where the molding material comes into contact with the first region master mold molding surface, to accommodate the inner mold in the accommodating concave portion of the outer mold, whereby molding is performed by making a portion of the molding material not coming into contact with the first region master mold molding surface along the second region master mold molding surface of the master mold, thereby obtaining a molded body having the first region and the second region.

In accordance with the present invention, a molded body in which generation of a wrinkle is suppressed can be produced.

It is preferred that the molding apparatus according to the present invention includes a preheating portion of preheating the mold before pressurization of the mold.

A production method of a molded body according to the present invention is a method for producing a molded body with the above-described molding apparatus, the method including:

preheating the mold by the preheating portion in a state where a second main surface of a flat plate-like molding material comes into contact with the first region master mold molding surface of the master mold;

applying a pressure so as to accommodate the inner mold in the accommodating concave portion by the pressurizing portion; and deforming the buffer material while maintaining the state where the molding material comes into contact with the first region master mold molding surface, to accommodate the inner mold in the accommodating concave portion of the outer mold, whereby molding is performed by making a portion of the molding material not coming into contact with the first region master mold molding surface along the second region master mold molding surface of the master mold, thereby obtaining a molded body having the first region and the second region.

In accordance with the present invention, a molded body in which generation of a wrinkle is suppressed can be produced using the molding material required for heating.

A molded body according to the present invention is a plate-like molded body having a first region and a second region provided on an outer periphery of the first region, in which a radius of curvature of the second region is smaller than a radius of curvature of the first region, and when a main surface of the molded body on the side of a direction where the second region is bent relative to the first region is defined as a first main surface, and a main surface on an opposite side thereto is defined as a second main surface, in a top view of the molded body seen from the second main surface side, in a case where a long-side direction of the molded body is defined as an m-axis, a short-side direction orthogonal to the m-axis is defined an n-axis, a center of gravity of the molded body is defined as a central point (m,n)=(0,0), a long-side dimension of the molded body is defined as M, and a short-side dimension of the molded body is defined as N, a stress integral value S in a plate thickness direction on a line segment A joining a point (M/4,0) and a point (−M/4,0) and a line segment B joining a point (0,N/4) and a point (0,−N/4) is 0.1 MPa or more and 3.0 MPa or less.

In accordance with the present invention, generation of a wrinkle in the first region of the molded body can be reduced. It is to be noted that the "wrinkle" as referred to herein is one generated due to physical unevenness, and it is generated in the case where the stress integral value S in the plate thickness direction is more than 3.0 MPa and is a spot where a shade is generated in a high-intensity transmitted optical image.

In the molded body according to the present invention, in the case where a length of the first region in a short-axis direction is defined as L mm, and in the molded body, an arithmetic average roughness in a range of L/10 mm from an outer edge of the first region of the second main surface toward the central point is defined as $Ra_1$, and an arithmetic average roughness of the second region is defined as $Ra_2$, it is preferred that a relation of ($Ra_1/Ra_2$>1.1) is satisfied, and $Ra_2$ is less than 10 nm.

In accordance with the present invention, since the relation of ($Ra_1/Ra_2$>1.1) is satisfied, the range of L/10 mm from the outer edge of the first region in the second main surface toward the central point and the second region in the second main surface can be discriminated from each other in terms of an appearance; and the range of L/10 mm from the outer edge can be used for positioning on carrying out processing, such as polishing, with respect to the outer surface of the molded body and can be effectively used for controlling a polishing margin at the time of polishing. In addition, even in the case of not carrying out processing, the range of L/10 mm from the outer edge can also be used for positioning on sticking a liquid crystal panel, an EL panel, etc.

In the molded body according to the present invention, it is preferred that the molded body is a cover member for protecting an object to be protected.

In this embodiment of the present invention, a molded body in which generation of a wrinkle is suppressed can be obtained, and the appearance of the object protected becomes good.

In the molded body according to the present invention, it is preferred that the molded body is made of a glass.

In this embodiment of the present invention, a molded body having both high strength and good texture is obtained.

BRIEF DESCRIPTION OF THE DRAWINGS

FIGS. 1A to 1C show a cover member (molded body) according to First and Second Embodiments of the present invention, in which FIG. 1A is a plan view seen from the second main surface side, FIG. 1B is a B-B line cross-sectional view of FIG. 1A, and FIG. 1C is a C-C line cross-sectional view of FIG. 1A.

DETAILED DESCRIPTION OF THE INVENTION

First Embodiment

Figure 2:
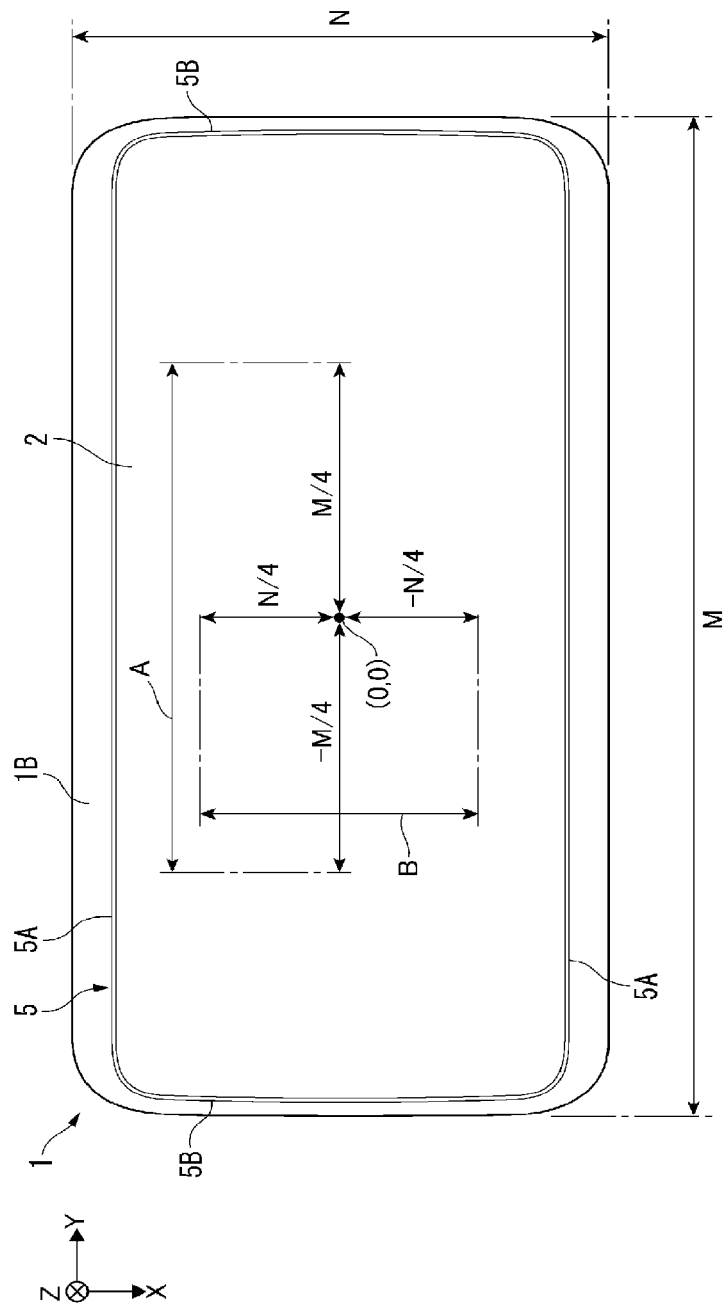
FIG. 2 is a plan view seen from the second main surface side for explaining a measurement range of a stress integral value S in the plate thickness direction of a cover member.

First Embodiment of the present invention is hereunder described by reference to the accompanying drawings.
[Configuration of Cover Member]
First of all, the configuration of the cover member is described.

As illustrated in FIGS. 1A, 1B, and 1C, a cover member 1 as a molded body is one for protecting a personal digital assistant, such as a smartphone, that is an object to be protected, and is obtained by subjecting a glass material as a rectangular flat plate-like molding material to molding with a mold, etc. as described later, such as press molding. The cover member 1 includes a flat portion 2 as a rectangular plate-like first region, a first bent portion 3 as a second region provided on the both end sides in the lateral direction of this flat portion 2, and a second bent portion 4 as a second region provided on the both end sides in the longitudinal direction.

The first bent portion 3 and the second bent portion 4 are each formed in an approximately arcuate shape and bent on the side of a first main surface 1A.

It is to be noted that while the first region of the cover member 1 has been described as a flat portion, it is not limited thereto but may be a curved bent portion. However, a radius of curvature of the second region is smaller than that of the first region.

In the case where the first region is formed as a bent portion, its radius of curvature is preferably 500 mm or more, and more preferably 5,000 mm or more. This is because surface deterioration to be caused due to rubbing with a mold in the molding step is lightened. Though an upper limit value of the radius of curvature of the first region is not particularly limited, it is preferably 500,000 mm or less, and more preferably 50,000 mm or less. This is because release properties from a mold are secured in the molding step.

The radius of curvature of the first and second bent portions 3 and 4 (second region) is preferably 1 mm or more, and more preferably 10 mm or more. This is because cracking of the molding material can be suppressed in the molding step. The radius of curvature of the first and second bent portions 3 and 4 is preferably 500 mm or less, and more preferably 250 mm or less. This is because a region where a tool mark by a tool used on preparing a die is transferred in the molding step can be reduced.

As for a boundary between the first region and the second region (outer edge of the first region), in the case where the first region is the flat portion 2, a region where the radius of curvature decreases from the center of gravity of the cover member 1 toward the outer edge and first becomes 5,000 mm or less is defined as the boundary between the first region and the second region; and in the case where the first region is a bent portion, a region where the radius of curvature decreases from the center of gravity of the cover member 1 toward the outer edge and first becomes 500 mm or less is defined as the boundary between the first region and the second region.

A measurement range where the stress integral value S in the plate thickness direction of the cover member 1 as the molded body is measured is described by reference to FIG. 2.

In a top view of the cover member 1 seen from the side of a second main surface 1B, a long-side direction of the cover member 1 is defined as an m-axis, a short-side direction orthogonal to the m-axis is defined an n-axis, and the center of gravity of the cover member 1 is defined as a central point (m,n)=(0,0). When a long-side dimension of the cover member 1 is defined as M, and a short-side dimension of the cover member 1 is defined as N, the measurement was performed on a line segment A joining a point (M/4,0) and a point (−M/4,0) in the m-axis direction from the central point and a line segment B joining a point (0,N/4) and a point (0,−N/4) in the n-axis direction, thereby determining a stress integral value S in the plate thickness direction.

The stress integral value S in the plate thickness direction is a value obtained by determining a phase difference R by a birefringence measurement system, such as WPA100, available from Photonic Lattice, Inc., and converting the resulting value into the stress integral value S in the plate thickness direction according to the following formula.

Stress integral value $S$ in the plate thickness direction=(Phase difference $R$)/(Photoelastic constant $C$ of the cover member 1)

When a main stress difference is defined as σ, and a plate thickness is defined as t, since the relation between the phase difference R and the photoelastic constant C is expressed by R/C=σt, the stress integral value S in the plate thickness direction of the present invention is corresponding to σt that is corresponding to the integral value of the main stress. Here, the main stress difference σ is a difference between a maximum value and a minimum value of the vertical stress when a shear stress is 0, and it can be measured by a birefringence measurement system, such as WPA100, available from Photonic Lattice, Inc.

In the molded body of the present invention, a maximum value $S_{max}$ of the stress integral value S in the plate thickness direction as measured by the line segment A and the line segment B is 3.0 MPa or less. In the molded body of the present invention, a strain in the first region immediately after molding by an in-plane stress is suppressed, whereby generation of a wrinkle in the molded body can be reduced. In addition, in the present invention, shape deformation that is generated by chemically strengthening a sample in which an in-plain stress distribution is non-uniform can be suppressed, and even in a molded body after chemical strengthening, a desired design shape can be maintained. In addition, since in-plane birefringence becomes small, an effect for reducing an optical strain is revealed. $S_{max}$ is preferably 2.8 MPa or less, and more preferably 2.6 MPa or less. In addition, $S_{max}$ is 0.1 MPa or more. This is because though cracking is possibly generated in a post-step such as surface grinding due to a surface tensile stress of the molded body after molding, such cracking can be reduced. $S_{max}$ is preferably 0.3 MPa or more, and more preferably 0.5 MPa or more.

The second main surface 1B is provided with a linear transfer portion 5 having a closed linear shape, as the need arises. The linear transfer portion 5 is formed in a rectangular frame-like shape having a first transfer portion 5A provided on the boundary between the flat portion 2 and the first bent portion 3 and a second transfer portion 5B provided on the boundary between the flat portion 2 and the second bent portion 4. In the case where a length of the flat portion 2 in the short-axis direction is defined as L mm, the linear transfer portion 5 is existent in a range of L/10 mm from the outer edge of the flat portion 2 toward the central point on the second main surface 1B.

In the cover member 1, in the case where an arithmetic average roughness in a range of L/10 mm from the outer edge of the flat portion 2 toward the central point, the range including the linear transfer portion 5 on the second main surface 1B, is defined as $Ra_1$, and an arithmetic average roughness of the first bent portion 3 and the second bent portion 4 on the side of the second main surface 1B is defined as $Ra_2$, it is preferred that a relation of $(Ra_1/Ra_2>1.1)$ is satisfied, and $Ra_2$ is less than 10 nm.

According to this, the linear transfer portion 5 in the vicinity of the edge of the flat portion 2 becomes larger in the surface roughness than the first and second bent portions 3 and 4 and can be utilized for positioning at the time of polishing. In addition, since the first and second bent portions 3 and 4 are smooth, only the flat portion 2 may be polished, and the polishing step of the first and second bent portions 3 and 4 can be lightened, whereby the cover member 1 with an excellent spectacle is obtained. On the other hand, at the time of sticking to a liquid crystal panel as in a cover glass of smartphone, in the case of using the second main surface 1B as a sticking surface, since the roughness of the linear transfer portion 5 is larger in the arithmetic average roughness Ra than the flat portion 2, adhesiveness of an adhesive to be used for sticking is improved.

$Ra_1/Ra_2$ is preferably $(Ra_1/Ra_2>2)$. According to this, a contrast is obtained, and hence, it becomes easy to execute positioning at the time of polishing, and in the case of forming the sticking surface to a display, adhesiveness to a sticking agent is improved. $Ra_1/Ra_2$ is preferably $(Ra_1/Ra_2 \leq 10)$. This is because when $Ra_1/Ra_2$ is the upper limit value or less, the roughness of the flat portion 2 is not excessively rough, so that a load of the polishing step may not be increased.

$Ra_2$ is preferably $(Ra_2 \leq 8$ nm$)$. According to this, a contrast is obtained, and hence, it becomes easy to execute positioning at the time of polishing, and in the case of forming the sticking surface to a display, adhesiveness to a sticking agent is improved. Though a lower limit of $Ra_2$ is not particularly limited, $(Ra_2 \geq 1$ nm$)$ is preferred. This is because according to this, on inserting the cover member 1 into a casing to be used for a final product and using it, when a user holds it by hand, a minimum gripping force can be guaranteed, whereby a nonslip effect is obtained.

It is preferred that the molded body of the present invention is made of a glass. According to this, a molded body having both high strength and good texture is obtained.

The molded body of the present invention is preferably a physically strengthened glass or a chemically strengthened glass, and more preferably a chemically strengthened glass. According to this, a molded body with excellent strength and scratch resistance can be obtained.

[Configuration of Mold]

Next, the configuration of the mold is described.

In the following, the explanation is made while defining the X-axis direction as a front-back direction, the Y-axis direction as a horizontal direction, and the Z-axis direction as a vertical direction, respectively in FIG. 3.

Figure 3:
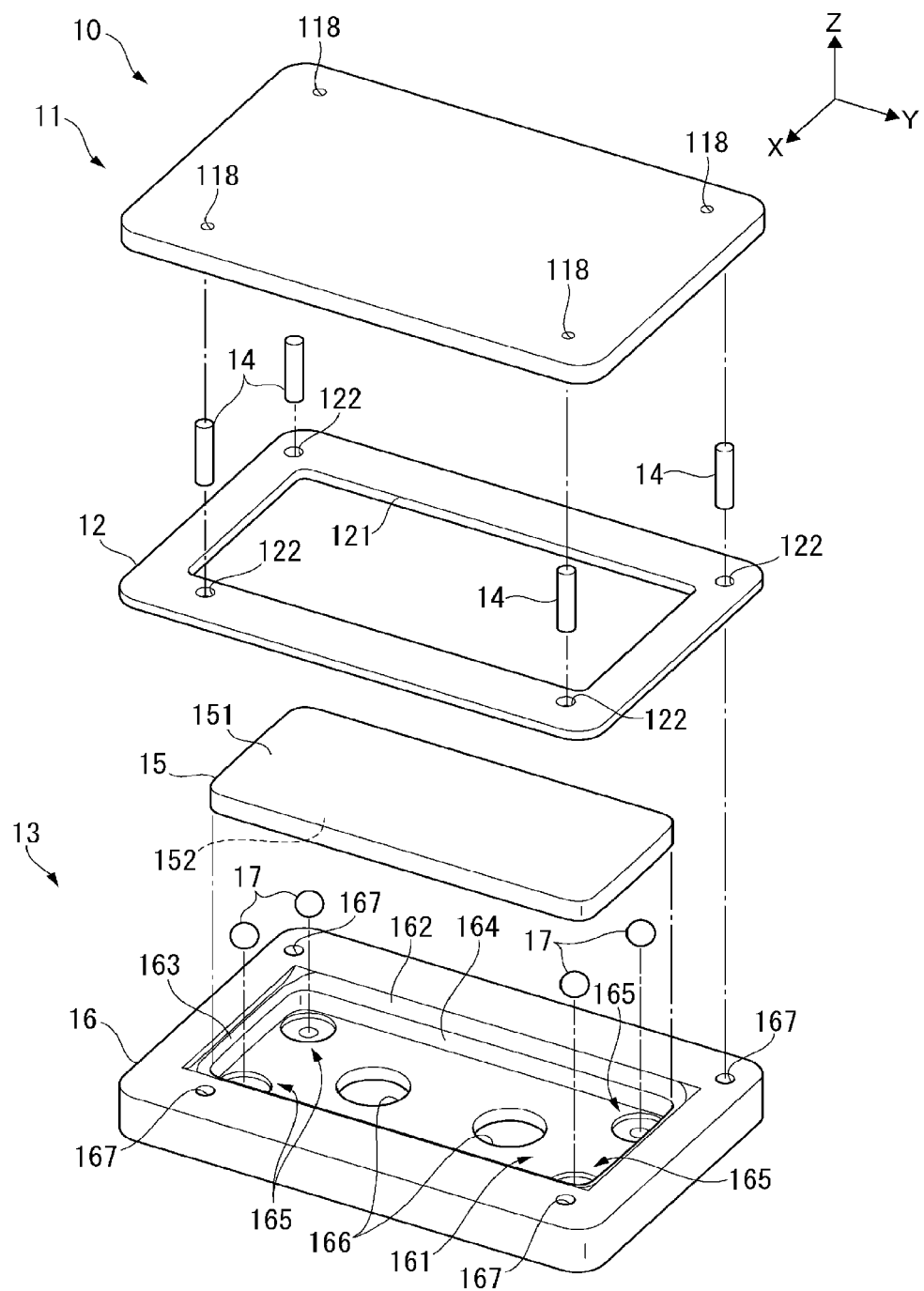
FIG. 3 is an exploded perspective view of a mold to be used for molding of a cover member.

In FIG. 3, a mold 10 includes an auxiliary mold 11 as an upper mold, a positioning plate 12, a master mold 13 as a lower mold, and four pins 14. It is preferred that the auxiliary mold 11, the positioning plate 12, the master mold 13, and the pins 14 are each made of carbon.

Figure 4:
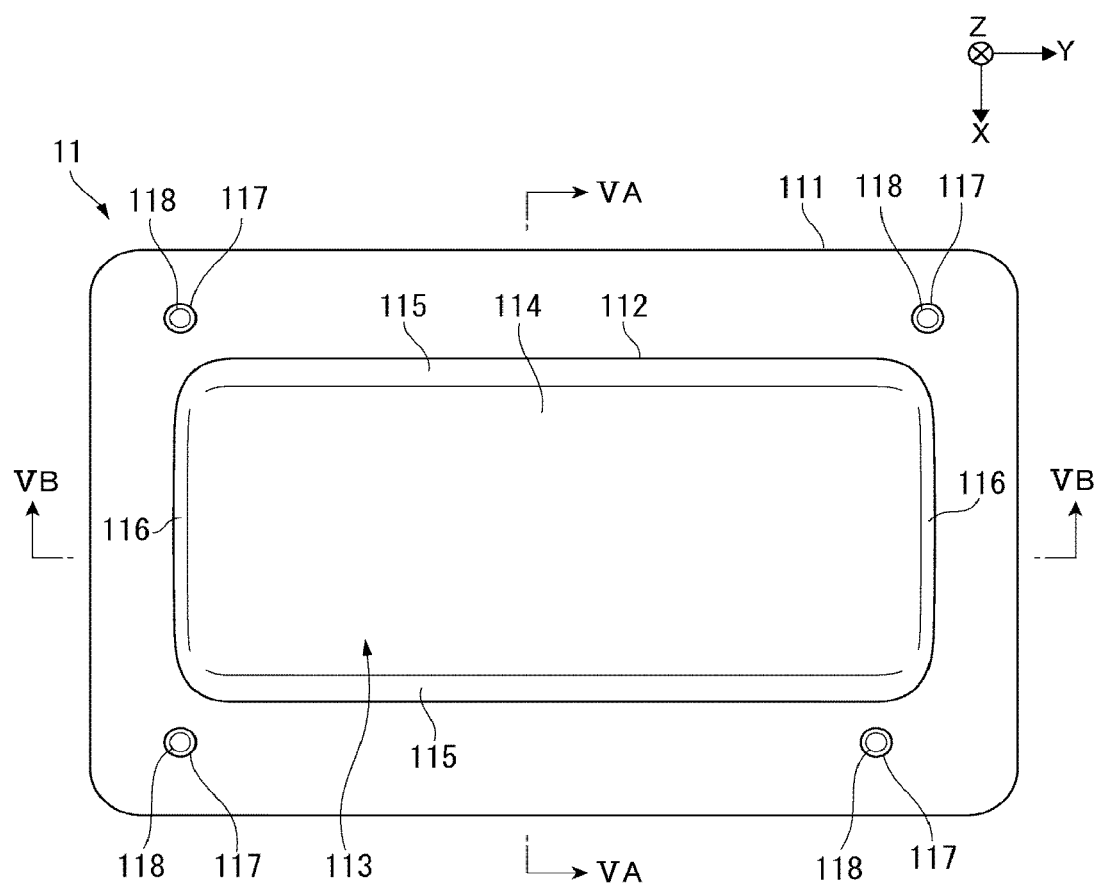
FIG. 4 is a bottom view of an auxiliary mold configuring a mold of First Embodiment.
Figure 5A:
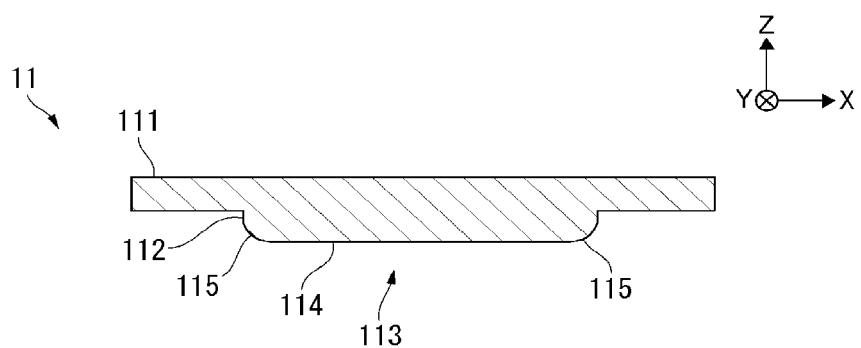
FIG. 5A is a VA-VA line cross-sectional view of FIG. 4.
Figure 5B:
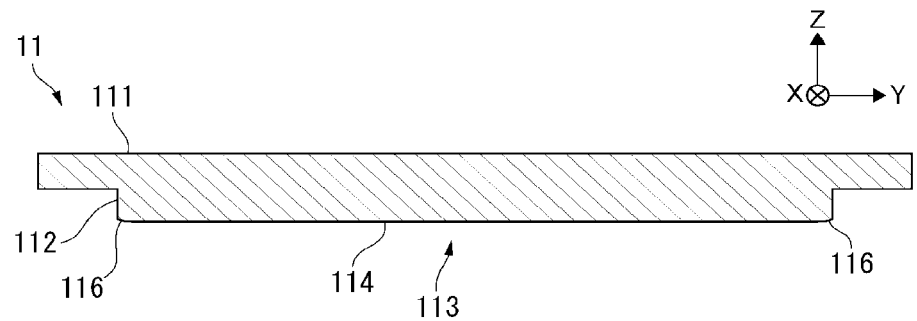
FIG. 5B is a VB-VB line cross-sectional view of FIG. 4.

As illustrated in FIG. 4 and FIGS. 5A and 5B, the auxiliary mold 11 includes a rectangular plate-like auxiliary mold base portion 111, the longitudinal direction of which coincides with the horizontal direction. A lower surface of the auxiliary mold base portion 111 has a convex portion 112 protruded downwardly.

The lower surface of the convex portion 112 configures an auxiliary mold molding surface 113. The auxiliary mold molding surface 113 includes a flat portion auxiliary mold molding surface 114 as a rectangular first region auxiliary mold molding surface for molding the flat portion 2 of the cover member 1. A first bent portion auxiliary mold molding surface 115 as a second region auxiliary mold molding surface for molding the first bent portion 3 of the cover member 1 is provided on the both ends in the lateral direction of the flat portion auxiliary mold molding surface 114, and a second bent portion auxiliary mold molding surface 116 as a second region auxiliary mold molding surface for molding the second bent portion 4 of the cover member 1 is provided on the both ends in the longitudinal direction.

On the outsides of four corners of the convex proton 112 in the lower surface of the auxiliary mold base portion 111, pin fitting grooves 117 into which the pins 14 are fitted, respectively, and air vent holes 118 which are provided on the upper sides of the pin fitting grooves 117 and are smaller than the pin fitting grooves 117 are provided. In the four pin fitting grooves 117, a shape connecting these to each other forms a trapezoid but not a rectangle, and the auxiliary mold 11 is configured such that it is installed always in the same direction relative to the master mold 13.

As illustrated in FIG. 3, the positioning plate 12 is formed in a rectangular frame-like shape such that its outer shape is the same as the auxiliary mold base portion 111 of the auxiliary mold 11. An internal space of the positioning plate 12 configures a positioning hole 121 for positioning a glass material G (see FIG. 9A). Four pin through-holes 122 through which the pins 14 penetrate are provided outside of the positioning hole 121. Similar to the pin fitting grooves 117 of the auxiliary mold 11, the four pin through-holes 122 are provided such that a shape connecting these to each other forms a trapezoid.

The mold 13 includes an inner mold 15, an outer mold 16, and glass beads 17 as a buffer material.

The inner mold 15 is formed such that its outer shape is a rectangular shape which is the same as the auxiliary mold molding surface 113 of the auxiliary mold 11. One surface of the inner mold 15 configures, for example, a flat portion master mold molding surface 151 as the planar first region master mold molding surface, and the other surface of the inner mold 15 configures a planar buffer material pressurizing surface 152 for pressurizing the glass beads 17 against the outer mold 16.

Figure 6:
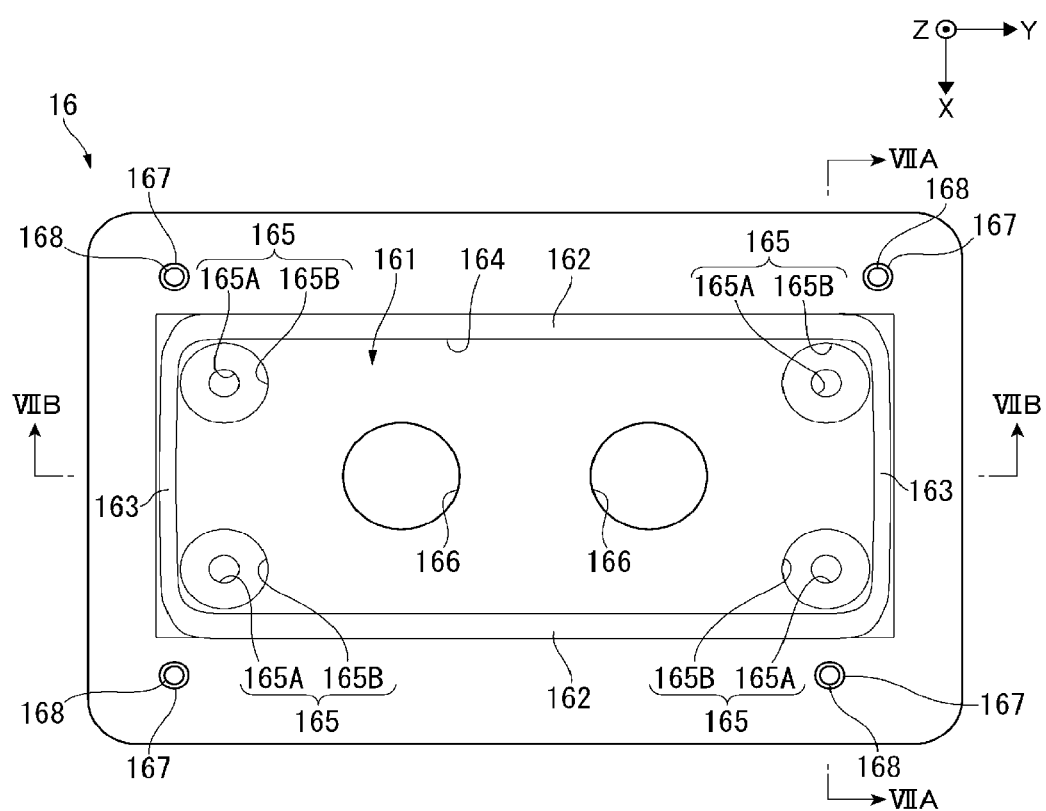
FIG. 6 is a plan view of an outer mold of a master mold configuring a mold.
Figure 7A:
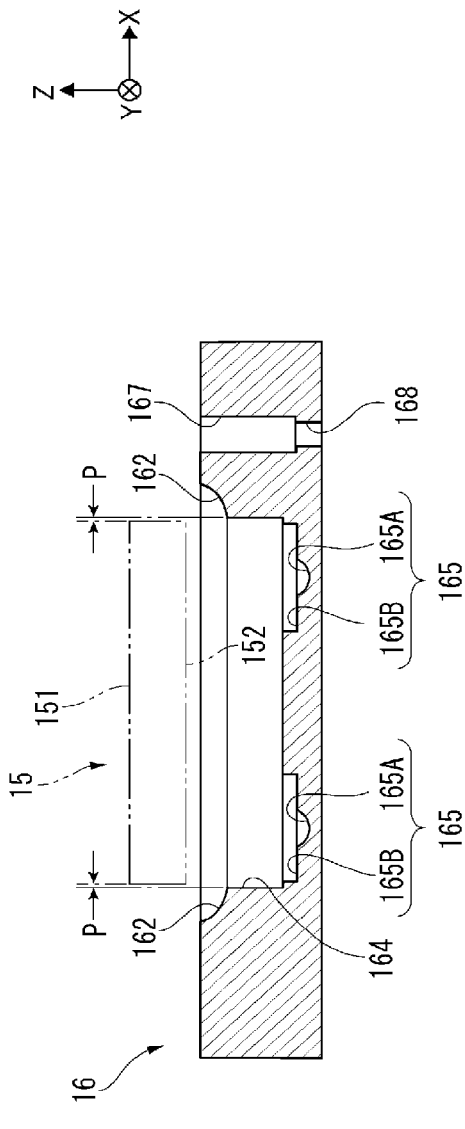
FIG. 7A is a VIIA-VIIA line cross-sectional view of FIG. 6.
Figure 7B:
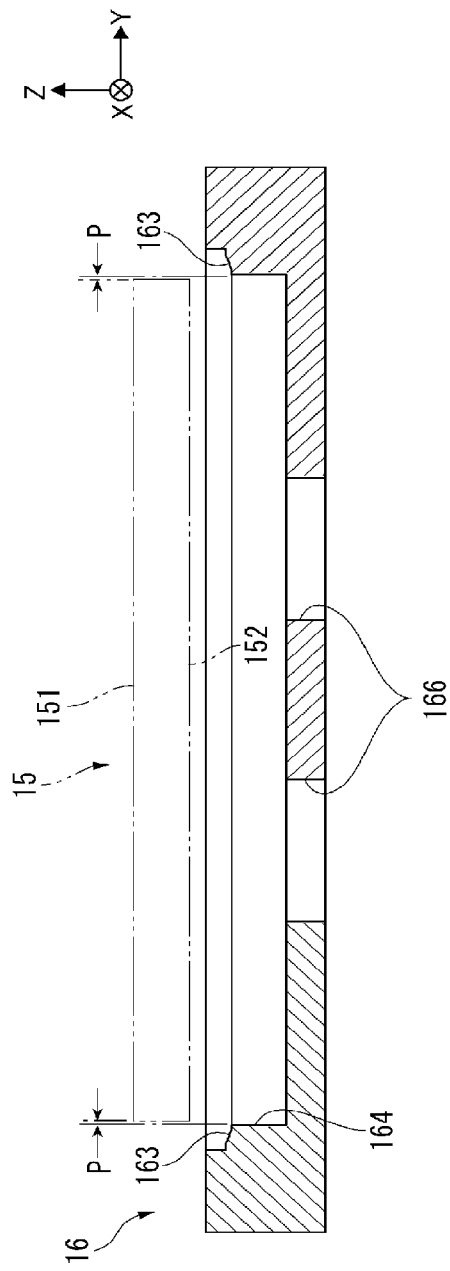
FIG. 7B is a VIIB-VIIB line cross-sectional view of FIG. 6.

As illustrated in FIG. 6 and FIGS. 7A and 7B, the outer mold 16 includes an outer mold concave portion 161 depressed downwardly and having a rectangular shape in a top view.

In the portion on the upper end side in this outer mold concave portion 161, a first bent portion master mold molding surface 162 as the second region master mold molding surface for molding the first bent portion 3 of the cover member 1 is provided on the both ends in the lateral direction, and a second bent portion master mold molding surface 163 as the second region master mold molding surface for molding the second bent portion 4 of the cover member 1 is provided on the both ends in the longitudinal direction.

A portion on the lower side than the first bent portion master mold molding surface 162 and the second bent portion master mold molding surface 163 in the outer mold concave portion 161 configures an accommodating concave portion 164 capable of accommodating the inner mold 15 therein. Namely, the bent portion master mold molding surfaces (162 and 163) are provided on at least a part of an outer edge of the accommodating concave portion 164. A shape of the accommodating concave portion 164 in a top view is a rectangular shape slightly larger than the inner mold 15 in such a manner that when accommodating the inner mold 15, gaps P having the same size are provided in the front-back direction and the horizontal direction, respectively. In addition, a depth of the accommodating concave portion 164 is substantially the same as a thickness of the inner mold 15.

Bead-positioning portions 165 as a buffer material-positioning portion are provided on the bottom surface of the accommodating concave portion 164. The bead-positioning portions 165 are provided at positions corresponding to four corners of the flat portion 2 as the first region in the cover member 1. The bead-positioning portion 165 includes an inner positioning concave portion 165A concaved spherically so as to accommodate a part of the glass beads 17 therein, and an outer positioning concave portion 165B concaved circularly, which is provided on the peripheral edge of this inner positioning concave portion 165A and is more shallower than the inner positioning concave portion 165A.

On the bottom surface of the accommodating concave portion 164, two through-holes 166 penetrating through the bottom surface are provided in a line in the longitudinal direction of the accommodating concave portion 164.

On the outsides of four corners of the outer mold concave portion 161 on the upper surface of the outer mold 16, pin fitting grooves 167 into which the pins 14 are fitted, respectively, and air vent holes 168 which are provided on the lower sides of the pin fitting grooves 167 and are smaller than the pin fitting grooves 167 are provided. Similar to the pin fitting grooves 117 of the auxiliary mold 11, the four pin fitting grooves 167 are provided such that a shape connecting these to each other forms a trapezoid.

The glass bead 17 as the buffer material is formed in a spherical shape in which the curvature thereof is larger than that of the inner positioning concave portion 165A. It is preferred that the glass bead 17 is made of a soda glass or a borate glass.

It is preferred that a coefficient of thermal conductivity of the glass bead 17 is 1.5 W/(m·K) or less. This is because the glass bead 17 has a role of a heat insulator and is able to inhibit the thermal conduction from the outer mold 16 to be heated by a lower heater to the molding material, and therefore, a transfer mark to be caused due to the flat portion master mold molding surface 151 of the inner mold 15 can be reduced, and the appearance quality can be improved. The coefficient of thermal conductivity of the glass bead 17 is more preferably 1.2 W/(m·K) or less, and still more preferably 1.0 W/(m·K) or less. In addition, the coefficient of thermal conductivity of the glass bead 17 is preferably 0.1 W/(m·K) or more. According to this, the mold during molding can be easily subjected to temperature rise, and a tact time can be shortened. The coefficient of thermal conductivity of the glass bead 17 is more preferably 0.3 W/(m·K) or more, and still more preferably 0.5 W/(m·K) or more.

[Configuration of Molding Apparatus]

Next, the configuration of the molding apparatus is described.

Figure 8:
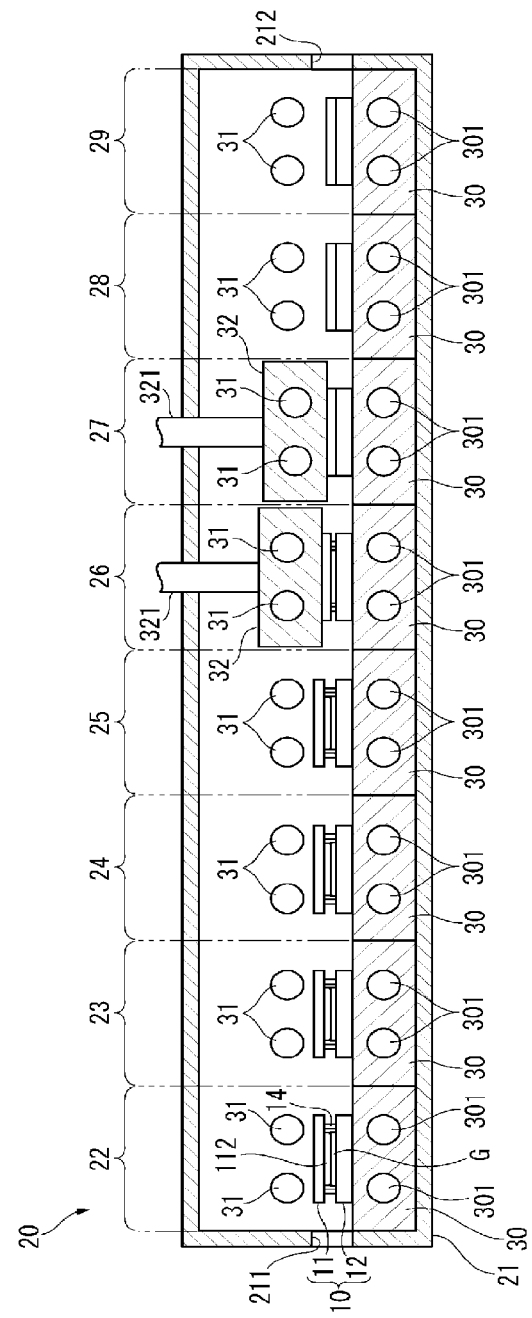
FIG. 8 is a cross-sectional view of a molding apparatus to be used for molding of a cover member.

In FIG. 8, a molding apparatus 20 includes a chamber 21. In the inside of the chamber 21, a glass material G is press molded to obtain the cover member 1. On one end side in the horizontal direction of the chamber 21, an intake port 211 for intaking the mold 10 having the glass material G before molding set therein is provided, and on the other end side, a discharge port 212 for discharging the mold 10 having the cover member 1 after molding accommodated therein is provided.

In the inside of the chamber 21, a first preheating zone 22, a second preheating zone 23, a third preheating zone 24, a fourth preheating zone 25, a first molding zone 26, a second molding zone 27, a first annealing zone 28, and a second annealing zone 29 are provided from the intake port 211 to the discharge port 212. The first to fourth preheating zones 22 to 25 are corresponding to the preheating portion of the present invention, and the first to second molding zones 26 to 27 are corresponding to the pressurizing portion of the present invention.

In each of the zones 22 to 29, one stage 30 for supporting the mold 10 from the bottom is provided. In the inside of each of the stages 30, at least one lower heater 301 for heating the mold 10 from the bottom is provided.

In an upper portion of the stage 30 of each of the zones 22 to 29, at least one upper heater 31 for heating the mold 10 from the top is provided.

The upper heater 31 in each of the first molding zone 26 and the second molding zone 27 is configured such that it can ascend/descend by a piston shaft 321 and is provided in the inside of a pressing member 32 for pressing the mold 10 from the top.

In the inside of the chamber 21, a non-illustrated transport mechanism for successively moving the mold 10 from the first preheating zone 22 to the second annealing zone 29; and a non-illustrated gas introducing portion for introducing an inert gas, are provided.

Furthermore, in the outside of the chamber 21, a non-illustrated discharge pin which is penetrated into the through-hole 166 of the outer mold 16 and which discharges the inner mold 15 and the cover member 1 from the outer mold 16 is provided.

The number of each of the lower heater 301 and the upper heater 31 may be the same or different among the respective zones 22 to 29. In addition, in the chamber 21, a non-illustrated partition member for partitioning the respective zones 22 to 29 may be provided within a range where the mold 10 is movable.

[Molding Method of Cover Member]

Next, the molding method of the cover member 1 is described.

First of all, the glass material G and the glass bead 17 are prepared.

As the glass material an alkali-free glass, a soda lime glass, a soda lime silicate glass, an aluminosilicate glass, a boron silicate glass, a lithium aluminosilicate glass, a borosilicate glass, and so on can be used. Among these, an aluminosilicate glass and a lithium aluminosilicate glass can be preferably used.

More specifically, though a composition of the glass material G is not particularly limited, examples thereof include glasses containing 50 to 80% of $SiO_2$, 0.1 to 25% of $Al_2O_3$, 3 to 30% of ($Li_2O+Na_2O+K_2O$), 0 to 25% of MgO, 0 to 25% of CaO, and 0 to 5% of $ZrO_2$, in terms of a composition as expressed by mol % on the basis of oxides.

More specifically, the following glass compositions are exemplified. It is to be noted that, for example, the wording "containing 0 to 25% of MgO" means that though MgO is not essential, it may be contained in an amount of up to 25%.
(i) A glass containing 63 to 73% of $SiO_2$, 0.1 to 5.2% of $Al_2O_3$, 10 to 16% of $Na_2O$, 0 to 1.5% of $K_2O$, 0 to 5.0% of $Li_2O$, 5 to 13% of MgO, and 4 to 10% of CaO, in terms of a composition as expressed by mol % on the basis of oxides.
(ii) A glass containing 50 to 74% of $SiO_2$, 1 to 10% of $Al_2O_3$, 6 to 14% of $Na_2O$, 3 to 11% of $K_2O$, 0 to 5.0% of $Li_2O$, 2 to 15% of MgO, 0 to 6% of CaO, and 0 to 5% of $ZrO_2$, in which a total of the contents of $SiO_2$ and $Al_2O_3$ is 75% or less, a total of the contents of $Na_2O$ and $K_2O$ is 12 to 25%, and a total of the contents of MgO and CaO is 7 to 15%, in terms of a composition as expressed by mol % on the basis of oxides.
(iii) A glass containing 68 to 80% of $SiO_2$, 4 to 10% of $Al_2O_3$, 5 to 15% of $Na_2O$, 0 to 1% of $K_2O$, 0 to 5.0% of $Li_2O$, 4 to 15% of MgO, and 0 to 1% of $ZrO_2$, in terms of a composition as expressed by mol % on the basis of oxides.
(iv) A glass containing 67 to 75% of $SiO_2$, 0 to 4% of $Al_2O_3$, 7 to 15% of $Na_2O$, 1 to 9% of $K_2O$, 0 to 5.0% of $Li_2O$, 6 to 14% of MgO, and 0 to 1.5% of $ZrO_2$, in which a total of the contents of $SiO_2$ and $Al_2O_3$ is 71 to 75%, and a total of the contents of $Na_2O$ and $K_2O$ is 12 to 20%, and when CaO is contained, its content is less than 1%, in terms of a composition as expressed by mol % on the basis of oxides.
(v) A glass containing 56 to 73% of $SiO_2$, 10 to 24% of $Al_2O_3$, 0 to 6% of $B_2O_3$, 0 to 6% of $P_2O_5$, 2 to 7% of $Li_2O$, 3 to 11% of $Na_2O$, 0 to 5% of $K_2O$, 0 to 8% of MgO, 0 to 2% of CaO, 0 to 5% of SrO, 0 to 5% of BaO, 0 to 5% of ZnO, 0 to 2% of $TiO_2$, and 0 to 4% of $ZrO_2$, in terms of a composition as expressed by mol % on the basis of oxides.

As a composition of the glass bead 17, an alkali-free glass, a soda lime glass, a soda lime silicate glass, an aluminosilicate glass, a boron silicate glass, a lithium aluminosilicate glass, a borosilicate glass, and so on can be used. Among these, an aluminosilicate glass and a lithium aluminosilicate glass can be preferably used.

More specifically, though the composition of the glass bead 17 is not particularly limited, examples thereof include glasses containing 50 to 80% of $SiO_2$, 0.1 to 10% of $Al_2O_3$, 0.1 to 10% of $B_2O_3$, 0.1 to 10% of MgO, 0.1 to 10% of CaO, 0.1 to 10% of BaO, 0.1 to 40% of $Na_2O$, 0.1 to 10% of $K_2O$, and 0 to 5% in total of at least one selected from the group consisting of $P_2O_5$, SrO, $TiO_2$, $Fe_2O_3$, $Co_2O_3$, ZnO, $ZrO_2$, $As_2O_3$, PbO, CdO, $Sb_2O_3$, $SO_3$, Cl and F, in terms of a composition as expressed by mol % on the basis of oxides.

As the glass material G and the glass bead 17, for example, first to fourth combinations shown in the following Table 1 can be exemplified.

TABLE 1

|  | First combination | | Second combination | | Third combination | | Fourth combination | |
| --- | --- | --- | --- | --- | --- | --- | --- | --- |
|  | Glass material | Glass bead | Glass material | Glass bead | Glass material | Glass bead | Glass material | Glass bead |
| Softening point log η = 7.65 | 853° C. | 704° C. | 821° C. | 677° C. | 780° C. | 677° C. | 780° C. | 569° C. |
| Annealing point log η = 13.0 | 635° C. | 533° C. | 606° C. | 518° C. | 547° C. | 518° C. | 547° C. | 445° C. |
| Strain point log η = 14.5 | 588° C. | 506° C. | 556° C. | 493° C. | 501° C. | 493° C. | 501° C. | 426° C. |

Figure 9A:
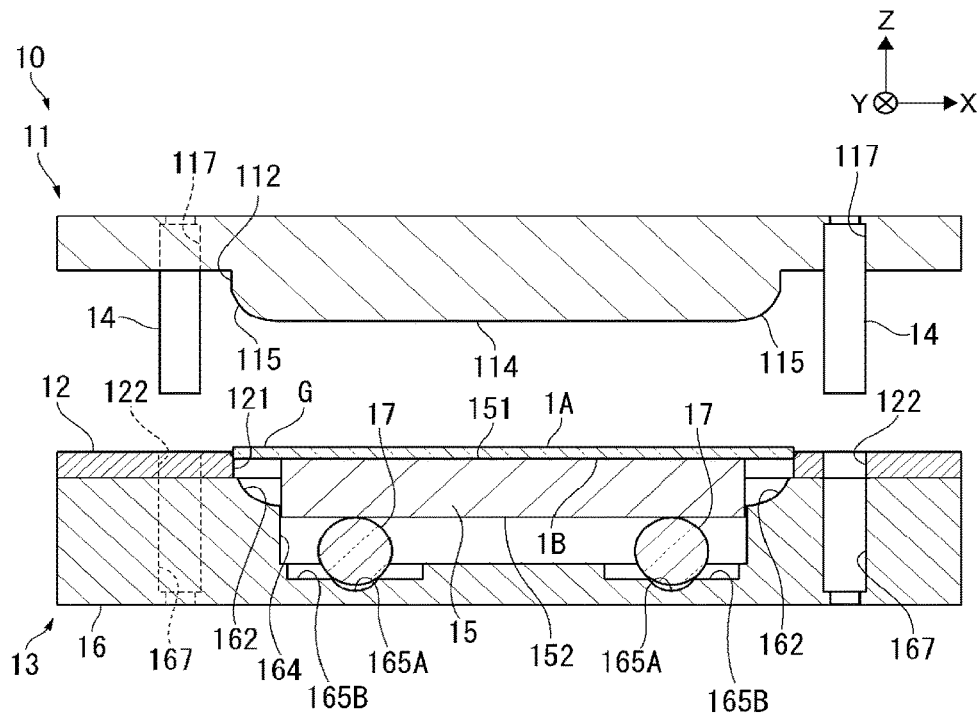
FIGS. 9A and 9B are explanatory views of a molding method (production method) of a cover member.

Subsequently, as illustrated in FIG. 9A, the flat plate-like glass material G is set in the mold 10.

On this setting, first of all, the glass bead 17 is placed on each of the four bead-positioning portions 165 to execute positioning. In this way, by using the bead-positioning parts 165, it becomes easy to execute positioning of the glass bead 17. In addition, at this time, by merely putting the glass bead 17 into the outer positioning concave portion 165B, the planar shape of which is larger than the diameter of the glass bead 17, the glass bead 17 rolls within the outer positioning concave portion 165B, and a part thereof is accommodated in the inner positioning concave portion 165A, whereby the precise positioning of the glass bead 17 can be easily achieved.

Subsequently, the inner mold 15 is placed on the four glass beads 17. Four spherical depresses, in each of which the glass bead 17 is accommodated, may be provided on the planar buffer material pressurizing surface 152 of the inner mold 15. By designing all of the positions of the inner mold 15 of the four depresses in the vertical and horizontal directions equal, all of the gaps P between each side of the inner mold 15 and each side of the accommodating concave portion 164 can be made the same as each other.

Thereafter, the positioning plate 12 is placed on the upper surface of the outer mold 16 such that the pin through-holes 122 are overlapped with the pin fitting grooves 167, and the glass material G is put into the positioning hole 121 of the positioning plate 12. According to this, the glass material G is positioned on the flat portion master mold molding surface 151 in a state where the center of the glass material G is coincident with the center of the flat portion master mold molding surface 151. In addition, at this time, the lower surface (second main surface 1B) of the glass material G coming into contact with the flat portion master mold molding surface 151 is positioned above the upper surface of the outer mold 16, and the glass material G is positioned such that it does not come into contact with the first and second bent portion master mold molding surfaces 162 and 163.

Thereafter, the pins 14 having been fitted into the pin fitting grooves 117 of the auxiliary mold 11 are fitted into the pin fitting grooves 167 via the pin through-holes 122, whereby the auxiliary mold 11 is placed due to its own weight on the glass material G According to this placement, the flat portion auxiliary mold molding surface 114 of the auxiliary mold 11 and the first main surface 1A of the glass material G make face contact with each other, and the outer peripheral portion of the glass material G is positioned between the first and second bent portion auxiliary mold molding surfaces 115 and 116 of the auxiliary mold 11 and the first and second bent portion master mold molding surfaces 162 and 163 of the outer mold 16.

It is to be noted that though the foregoing setting of the glass material G in the mold 10 is carried out by a non-illustrated robot, it may also be carried out by handwork by an operator.

Meanwhile, as advance preparations of press molding on the side of the molding apparatus 20, power sources of the lower heater 301 and the upper heater 31 within the chamber 21 are turned on, thereby heating the respective zones 22 to 29, and the chamber 21 is kept in an inert atmosphere.

Then, a non-illustrated transport mechanism transports the mold 10 having the glass material G set therein into chamber 21 and positions it within each of the zones 22 to 29 for a predetermined time.

At this time, first of all, the mold 10 is preheated in the first to fourth preheating zones 22 to 25, thereby softening the glass material G to a temperature at which it can be subjected to press molding.

Figure 9B:
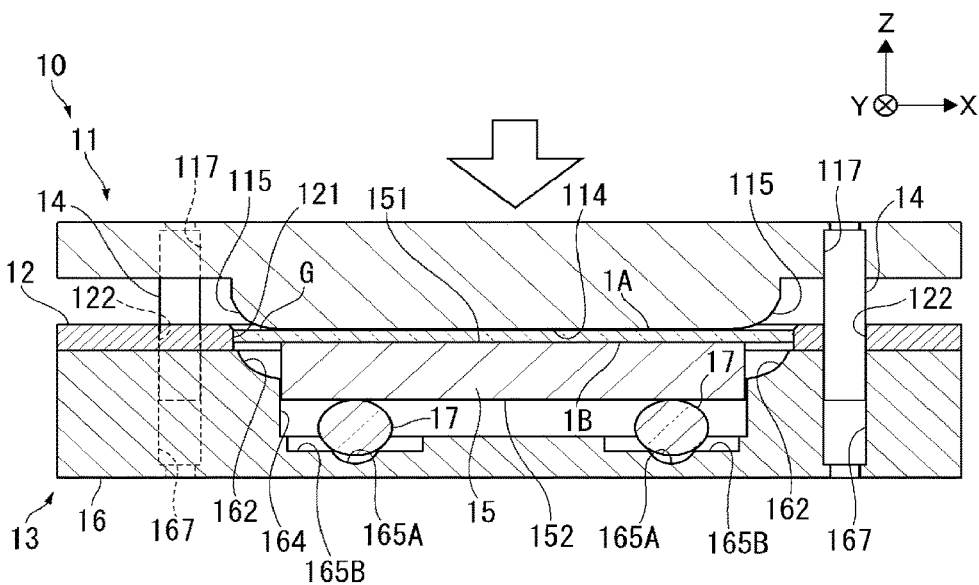
Figure 10A:
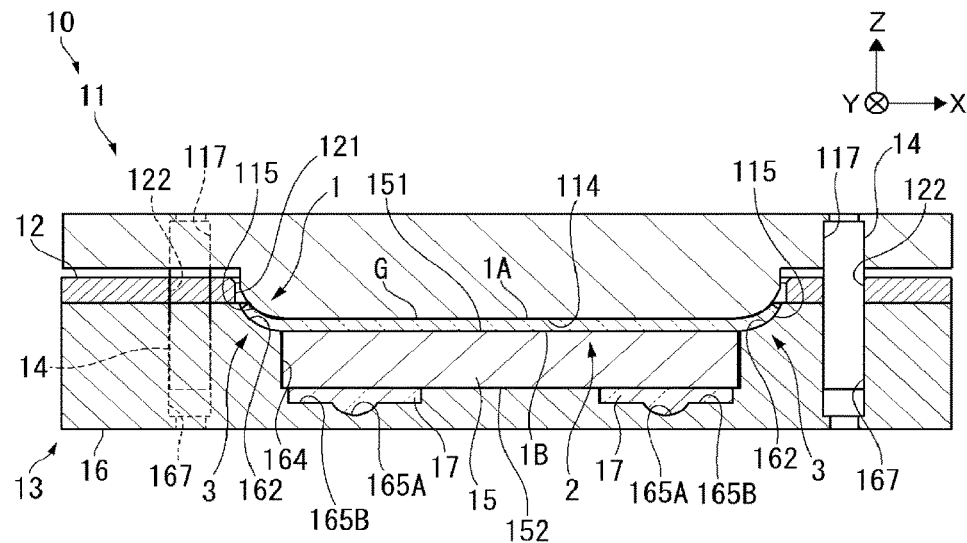
FIGS. 10A and 10B are explanatory views of a molding method of a cover member, following to FIGS. 9A and 9B.

Subsequently, as illustrated in FIG. 9B, in the first to second molding zones 26 to 27, the auxiliary mold 11 is pressed to the glass material G by the pressing member 32, and the glass beads 17 are plastically deformed in a state where the glass material G comes into contact with the flat portion auxiliary mold molding surface 114 of the auxiliary mold 11 and the flat portion master mold molding surface 151 of the master mold 13, thereby accommodating the inner mold 15 in the accommodating concave portion 164. Then, the auxiliary mold 11 is further pressed from the state illustrated in FIG. 9B, and as illustrated in FIG. 10A, a portion in the glass material G not coming into contact with the flat portion auxiliary mold molding surface 114 and the flat portion master mold molding surface 151 is pressed by the first and second bent portion auxiliary mold molding surfaces 115 and 116 and the first and second bent portion master mold molding surfaces 162 and 163, thereby molding the cover member 1 having the flat portion 2 and the first and second bent portions 3 and 4 as illustrated in FIGS. 1A to 1C. In addition, the second main surface 1B of the cover member 1 has the linear transfer portion 5 formed when a part of the softened glass material G comes into the gaps P between each side of the inner mold 15 and each side of the accommodating concave portion 164.

On such press molding, when the glass bead 17 is plastically deformed, the deformed portion first comes into the inner positioning concave portion 165A. Then, when the press molding is further advanced, a portion which has not come into the inner positioning concave portion 165A expands within the outer positioning concave portion 165B, and when it reaches the outer edge of the outer positioning concave portion 165B, the spreading is controlled. According to this control, the plastic deformation is controlled, too, a deformation quantity of the glass bead 17 becomes always constant, and not only the pressed state is stabilized, but also the quality of the cover member 1 is stabilized.

Thereafter, in the first to second annealing zones 28 to 29, the mold 10 and the cover member 1 are annealed and discharged from the chamber 21.

Figure 10B:
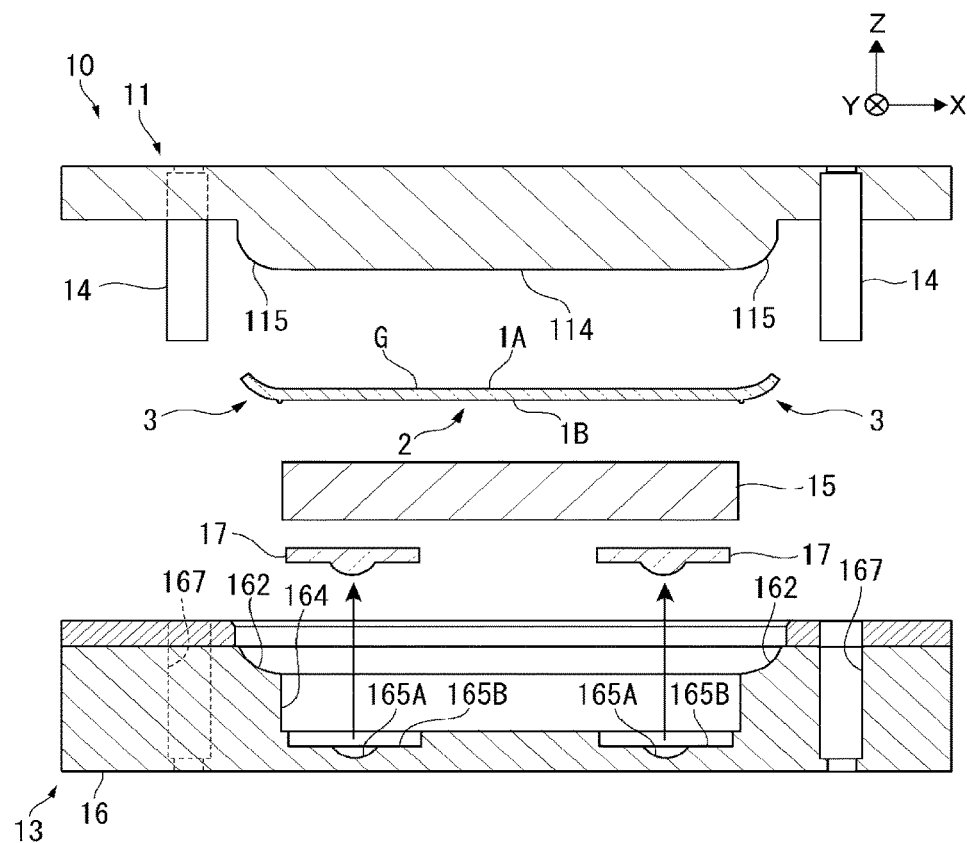

Then, in the outside the chamber 21, after the mold 10 and the cover member 1 are thoroughly cooled, as illustrated in FIG. 10B, a non-illustrated robot discharges the auxiliary mold 11 from the master mold 13. Subsequently, by penetrating a non-illustrated discharge pin into the through-hole 166, the inner mold 15 is discharged from the accommodating concave portion 164, and the cover member 1 on the inner mold 15 is transported into a next step. In this next step, the linear transport portion 5 of the cover member 1 may be removed by polishing, etc. or may not be removed.

In the case of not removing the linear transfer part 5, positioning at the time of arrangement of the cover member 1 may be easily executed taking the linear transfer portion 5 as a standard. In addition, taking into consideration the linear transfer portion 5 as a pattern, designability can be improved by a simple method of merely performing the press molding.

Thereafter, the glass beads having been deformed at the time of press molding are discharged, new glass beads 17 are placed in the outer mold concave portion 161 of the outer mold 16, and next press molding of the glass material G is performed by the same step as that described above.

Figure 11:
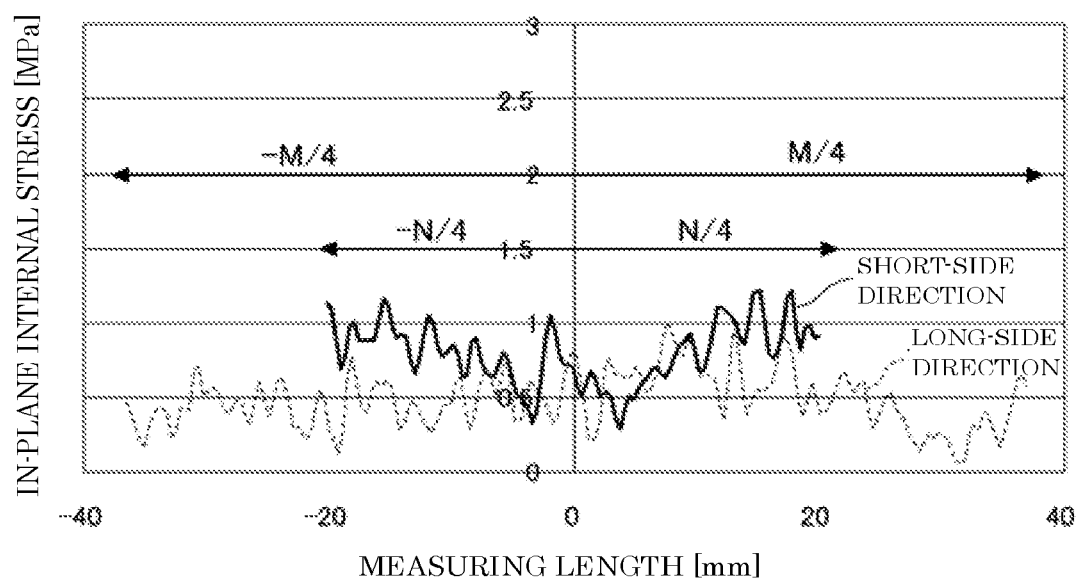
FIG. 11 is a graph showing measurement results of a stress integral value S in the plate thickness direction of a cover member (molded body I) obtained in First and Second Embodiments and Example 1 in the section of Examples, in the present invention.

In the foregoing press molding, in the case of using the first combination shown in Table 1 as the glass material G and the glass beads 17, by setting the preset temperatures of the upper heater 31 and the lower heater 301 of each of the zones 22 to 29 as those shown in the following Table 2, the cover member 1 having a stress distribution shown in FIG. 11 is obtained.

TABLE 2

| | Heater preset temperature | Measured temperature | Viscosity converted from measured temperature (log η) | | Total residence time within |
|---|---|---|---|---|---|
| | Uppe rside/ lower side | Upper side/ lower side | Glass material | Glass bead | chamber (min) |
| First preheating zone | 557° C./ 550° C. | 422° C./ 471° C. | 20.19 | 16.02 | 2 |
| Second preheating zone | 720° C./ 726° C. | 617° C./ 629° C. | 12.76 | 8.41 | 4 |
| Third preheating zone | 714° C./ 730° C. | 672° C./ 671° C. | 11.10 | 7.34 | 6 |
| Fourth preheating zone | 711° C./ 695° C. | 683° C./ 669° C. | 10.79 | 7.39 | 8 |
| First molding zone | 659° C./ 673° C. | 656° C./ 657° C. | 11.57 | 7.67 | 10 |
| Second molding zone | 639° C./ 648° C. | 639° C./ 645° C. | 12.08 | 7.97 | 12 |
| First annealing zone | 497° C./ 506° C. | 544° C./ 568° C. | 15.22 | 10.45 | 14 |
| Second annealing zone | 287° C./ 295° C. | 403° C./ 446° C. | 21.08 | 18.33 | 16 |

It is to be noted that in Table 2, the viscosities of the glass material G and the glass bead 17 in each of the zones 22 to 29 are a value of log η obtained according to the following formula (1).

$$\log q = A + B/(T-T_0) \tag{1}$$

A, B, $T_0$: See the following Table 3.

T in the case of determining the viscosity of the glass material: Measured temperature of the upper heater shown in Table 2

T in the case of determining the viscosity of the glass bead: Measured temperature of the lower heater shown in Table 2

TABLE 3

|   | Glass material | Glass bead |
|---|---|---|
| A | −22.396 | −1.329 |
| B | 41374 | 4089 |
| $T_0$ | −527.3 | 248.1 |

Here, the reason why in the case of calculating the viscosity of the glass material G, the measured temperature of the upper heater 31 was used resides in the matter that not only the heater contributing to the heating of the glass material G is the upper heater 31 closer to the glass material G than the lower heater 301, but also the viscosity of the glass material G is hardly influenced by the lower heater 301 due to the influence of the glass bead 17 having a low thermal conductivity. The reason why in the case of calculating the viscosity of the glass bead 17, the measured temperature of the lower heater 301 was used resides in the matter that not only the heater contributing to the heating of the glass bead 17 is the lower heater 301 closer to the glass bead 17 than the upper heater 31, but also the viscosity of the glass bead 17 is hardly influenced by the upper heater 31 due to the influence of the glass material G having a low thermal conductivity.

At an annealing point of the glass material G as a molding material, it is preferred that a logarithm $\log_{10}(\eta/\eta_0)$ of a ratio of an equilibrium viscosity $\eta$ (Pa·s) of the glass material G to an equilibrium viscosity $\eta_0$ (Pa·s) of the glass bead 17 as a buffer material is 1 or more and 5 or less. According to this, flatness of the flat portion 2 of the cover member 1 in the glass material G can be kept, and generation of a wrinkle in the flat portion 2 is effectively reduced.

The equilibrium viscosity ratio $\log_{10}(\eta/\eta_0)$ is more preferably 1.2 or more and 4.5 or less, and still more preferably 1.4 or more and 4.0 or less. This is because transfer of a tool mark remained on preparing the mold onto the glass surface after molding can be reduced, the stress integral value S in the plate thickness direction in the plane becomes small, and generation of a wrinkle in the glass surface can be reduced.

Actions and Effects of First Embodiment

In accordance with the above-described First Embodiment, by executing press molding while allowing a portion serving as the flat portion 2 in the glass material G to always come into contact with the flat portion auxiliary mold molding surface 114 of the auxiliary mold 11 and the flat portion master mold molding surface 151 of the master mold 13, bending of the portion serving as the flat portion 2 during press molding can be suppressed, and generation of a wrinkle to be caused due to this bending on the boundary between the flat portion 2 and the first and second bent portions 3 and 4 can be suppressed.

In particular, by arranging the glass beads 17 at the positions corresponding to the four corners of the flat portion 2 where a wrinkle is liable to be generated, bending of the inner mold 15 in the foregoing four corners can be suppressed, and the high-quality cover member 1 in which generation of a wrinkle is suppressed is obtained.

Since not only the buffer material pressurizing surface 152 of the inner mold 15 is planarly formed, but also the glass bead 17 is made spherical, the contact area of the buffer material pressurizing surface 152 with the glass bead 17 can be suppressed to the minimum. In consequence, a temperature difference between a contact portion and a non-contact portion with the glass bead 17 in the inner mold 15 can be suppressed to the minimum, and molding unevenness of the flat portion 2 of the cover member 1 can be suppressed.

After press molding, by penetrating the discharge pin into the through-hole 166 of the accommodating concave portion 164 to press the inner mold 15, the inner mold 15 and the cover member 1 can be easily discharged from the outer mold 16.

Second Embodiment

Next, Second Embodiment of the present invention is hereunder described by reference to the accompanying drawings.

It is to be noted that the same configurations as those in the First Embodiment are given the same symbols, and explanations thereof are omitted or simplified.

Figure 12A:
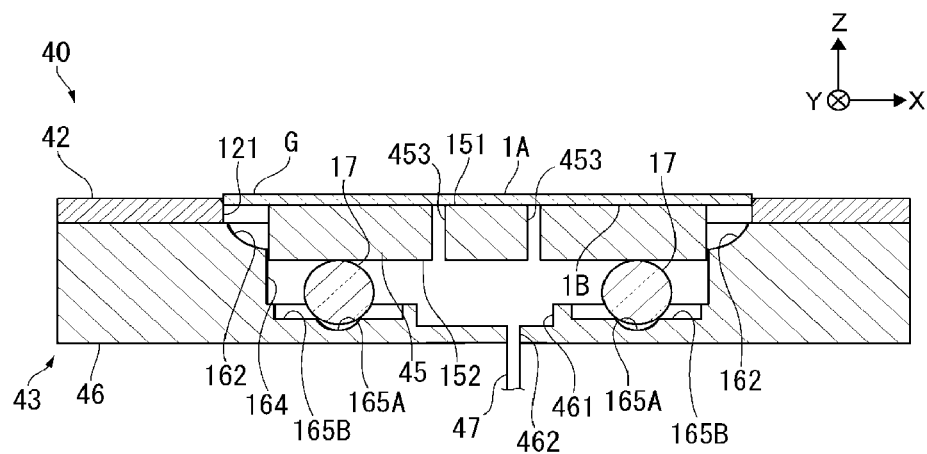
FIGS. 12A and 12B are an explanatory view of a molding method of a cover member using a mold of Second Embodiment.

In FIG. 12A, a mold 40 is used for the production of the cover member 1 which is the same as in the First Embodiment and includes a positioning plate 42 and a master mold 43 that is a lower mold. It is preferred that the positioning plate 42 and the master mold 43 are made of carbon.

The positioning plate 42 has the same configuration as in the positioning plate 12 of the First Embodiment, except that the pin through-holes 122 are not provided.

The master mold 43 includes an inner mold 45, an outer mold 46, and the glass bead 17.

The inner mold 45 has the same configuration as in the inner mold 15 of the First Embodiment, except that a suction hole 453 penetrating from a flat portion master mold molding surface 151 to a buffer material pressing surface 152 is provided. The suction hole 453 is not particularly limited with respect to its number and arrangement position so long as it has a configuration such that it can suck and hold the glass material G so as to closely adhere to the flat portion master mold molding surface 151.

The outer mold 46 has the same configuration as in the outer mold 16 of the First embodiment, except that an air intake groove 461 and a suction pipe through-hole 462 are provided; and that the pin fitting groove 167 is not provided. The air intake groove 461 is provided in the center of the bottom surface of the accommodating concave portion 164. One end of a suction pipe 47 is connected to the suction pipe through-hole 462, and the other end of the suction pipe 47 is connected to a non-illustrated suction apparatus.

When the cover member 1 is molded using the mold 40, as illustrated in FIG. 12A, the positioning plate 42, the glass beads 17, the inner mold 45, and the glass material G are set in the outer mold 46. Subsequently, a non-illustrated suction apparatus is driven, and the glass material G is sucked and held by the flat portion master mold molding surface 151 and softened to an extent of a temperature at which the glass material G can be molded.

Figure 12B:
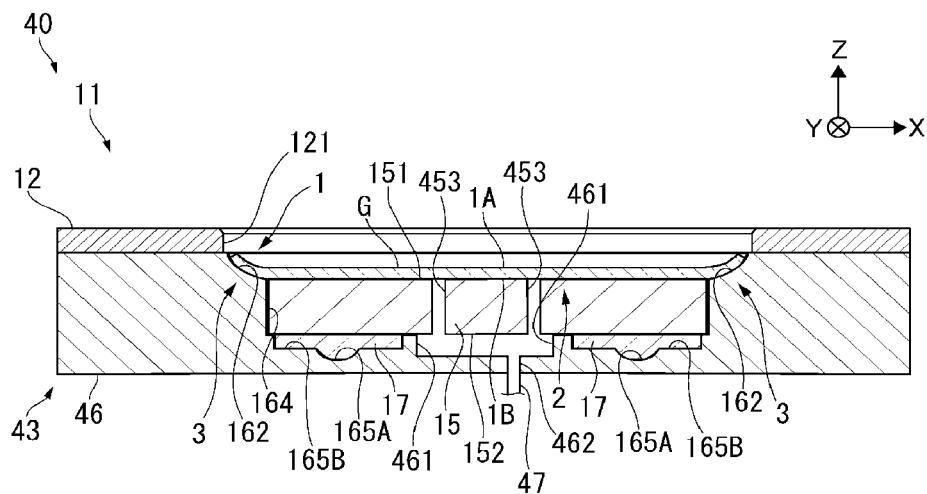

Thereafter, by moving at least one of the inner mold 45 and the outer mold 46 (relative movement) and plastically deforming the glass beads 17 as illustrated in FIG. 12B, a portion of the glass material G not coming into contact with the flat portion master mold molding surface 151 is molded so as to follow the first and second bent portion master mold molding surfaces 162 and 163, whereby the cover member 1 having the flat portion 2 and the first and second bent portions 3 and 4 as shown in FIGS. 1A to 1C can be obtained.

It is to be noted that as for a method of moving the inner mold 45 and the outer mold 46, by rendering the pressure of the accommodating concave portion 164 negative, an upper portion of the glass material G is pressed by atmosphere pressure, whereby the inner mold 45 is driven downwardly.

Modification Example

It is to be noted that the present invention is not limited to only the above-described embodiments, and various improvements and design changes, etc. can be made within a range where the gist of the present invention is not deviated. Besides, on carrying out the present invention, specific procedures and structures, etc. may be changed within a range where the object of the present invention can be attained.

For example, the molding material is not limited to one to be heated and molded but may be one to be subjected to cold molding or cooling molding. The molding material is not limited to the glass but may also be a resin or a metal. The molding apparatus may be selected in conformity with the temperature at the time of molding the molding material.

The shape of the molding material is not limited to a rectangular shape but may also be a polygonal plate-like shape or a disk-like shape.

In the First Embodiment, the master mold 13 may be used as the upper mold while using the auxiliary mold 11 as the lower mold, and in the Second Embodiment, the master mold 43 may be used as the upper mold.

The positioning plates 12 and 42 may not be provided.

A concave portion in which a part of the glass beads 17 is accommodated may be provided in the buffer material pressurizing surface 152 of each of the inner molds 15 and 45.

The bead-positioning portion 165 may not be provided, and only the inner positioning concave portion 165A may be configured. The inner positioning concave portion 165A may be in a columnar shape or a polygonal prism shape but not the spherical shape.

The buffer material of the present invention may be made of a resin or a metal without being limited to one made of a glass and may be selected in conformity with the material of the molding material.

The glass beads 17 may be arranged at positions corresponding to other positions than the four corners of the flat portion 2 as the first region, for example, the center in the plane of the flat portion 2 or the center of each of the sides. In this case, the bead-positioning portion 165 may be provided or may not be provided at the arrangement position of the glass bead 17.

The glass bead 17 may have a shape other than the spherical shape, such as a columnar shape, a polygonal prism shape, or a spring-like shape.

Each of the material of the auxiliary mold 11, the positioning plate 12, and the master mold 13, all of which configure the mold 10, and the positioning plate 42 and master mold 43, all of which configure the mold 40, is not limited to carbon but may be a superalloy, SiC, a ceramic mainly including $SiO_2$ such as quartz, boron nitride, Anviloy (a registered trademark), a stainless steel material, Inconel (a registered trademark, or the like.

The bent portion of the molded body may be provided on only a part of the outer periphery of the molding material.

The application of the molded body is not particularly limited. Specific examples thereof include a wall material and a component configuring a casing of an article.

The application of the cover member is not particularly limited. Specific examples thereof include transparent components for vehicles (e.g., headlight covers, side mirrors, front transparent substrates, side transparent substrates, rear transparent substrates, instrument panel surfaces, etc.), meters, architectural windows, show windows, architectural interior members, architectural exterior members, displays (e.g., notebook personal computers, monitors, LCDs, PDPs, ELDs, CRTs, PDAs, etc.), LCD color filters, substrates for touch panels, pickup lenses, optical lenses, glass lenses, camera components, video components, cover substrates for CCDs, end faces of optical fibers, projector components, copier machine components, transparent substrates for solar cells (e.g., cover members, etc.), cellar phone windows, backlight unit components (e.g., light guide plates, cold cathode ray tubes, etc.), LCD brightness-improving films for backlight unit components (e.g., prisms, half-transmission films, etc.), LCD brightness-improving films, organic EL light-emitting element components, inorganic EL light-emitting element components, fluorescent light-emitting element components, optical filters, end faces of optical components, illumination, lumps, covers for illumination devices, amplifying laser light sources, antireflective films, polarizer films, and films for agriculture.

EXAMPLES

Examples of the present invention are described. Examples 1 to 5 are concerned with working examples, and Example 6 is concerned with a comparative example. It is to be noted that the present invention is not limited to the following Examples.

[Thermal Conduction Simulation]

With respect to the temperature and equilibrium viscosity of the glass material and the glass bead during molding in each of the Examples, a thermal conduction analysis was carried out using a general-purpose analysis software ABAQUS (Ver. 6.13-2), available from Dassault Systemes and described on the basis of the obtained results.

First of all, using the ABAQUS, on the assumption of a state where the upper and lower heaters and the carbon mold upper and lower surfaces are adhered to each other, the glass temperature of the inside of the carbon mold in each of preheating, molding, and annealing zones was analytically determined. Physical properties values of the glass are shown in Table 4, and physical properties values of the carbon are shown in Table 5. A coefficient of thermal conductivity from the upper and lower heaters to the carbon mold upper and lower surfaces in each of the zones is shown in Table 6. It is to be noted that using a sheath K thermocouple (NCF600, diameter 0.5 mm×4,000 mm), available from Chino Corporation, the temperature of the glass in the inside of the carbon mold was measured, and the coefficient of thermal conductivity was calculated on the basis of the results of the measured temperature.

TABLE 4

| Name of material constant | Material constant | Unit |
| --- | --- | --- |
| Viscosity | $2.50 \times 10^{-9}$ | ton/mm$^3$ |
| Coefficient of thermal conductivity | $1.30 \times 10^{-3}$ | W/(mm · K) |
| Specific heat | $1.34 \times 10^6$ | J/(ton · K) |

TABLE 5

| Name of material constant | Material constant | Unit |
| --- | --- | --- |
| Viscosity | $1.88 \times 10^{-9}$ | ton/mm$^3$ |
| Coefficient of thermal conductivity (at 20° C.) | 0.12 | W/(mm · K) |

TABLE 5-continued

| Name of material constant | Material constant | Unit |
|---|---|---|
| Coefficient of thermal conductivity (at 1,000° C.) | 0.06 | W/(mm · K) |
| Specific heat (at 20° C.) | $0.71 \times 10^6$ | J/(ton · K) |
| Specific heat (at 500° C.) | $1.24 \times 10^6$ | J/(ton · K) |
| Specific heat (at 1,000° C.) | $1.50 \times 10^6$ | J/(ton · K) |

TABLE 6

| | | Coefficient of thermal conductivity | Unit |
|---|---|---|---|
| First preheating zone | Upper heater | $2.20 \times 10^{-4}$ | W/(mm² · K) |
| | Lower heater | $1.32 \times 10^{-3}$ | |
| Second preheating zone | Upper heater | $2.80 \times 10^{-4}$ | |
| | Lower heater | $8.60 \times 10^{-4}$ | |
| Third preheating zone | Upper heater | $3.00 \times 10^{-4}$ | |
| | Lower heater | $5.80 \times 10^{-4}$ | |
| Fourth preheating zone | Upper heater | $3.20 \times 10^{-4}$ | |
| | Lower heater | $1.00 \times 10^{-4}$ | |
| First molding zone | Upper heater | $8.30 \times 10^{-4}$ | |
| | Lower heater | $6.00 \times 10^{-5}$ | |
| Second molding zone | Upper heater | $6.60 \times 10^{-4}$ | |
| | Lower heater | $1.00 \times 10^{-5}$ | |
| First annealing zone | Upper heater | $4.00 \times 10^{-4}$ | |
| | Lower heater | $6.00 \times 10^{-4}$ | |
| Second annealing zone | Upper heater | $3.00 \times 10^{-4}$ | |
| | Lower heater | $5.00 \times 10^{-4}$ | |

With respect to Example 1, a method of calculating the equilibrium viscosity of the glass from the glass temperature obtained through the thermal conduction analysis is described. The results of the glass temperature of the inside of the carbon mold in each of the preheating, molding, and annealing zones, as obtained through the thermal conduction analysis are shown in Table 2.

As for the viscosities of the glass material and the glass bead in each of the zones, a value of log η is determined by substituting the temperature shown in Table 2 into T according to the following formula (1).

$$\log \eta = A + B/(T - T_0) \quad (1)$$

A, B, $T_0$: See the following Table 7.

T in the case of determining the viscosity of the glass material: Measured temperature of the upper heater shown in Table 2

T in the case of determining the viscosity of the glass bead: Measured temperature of the lower heater shown in Table 2

It is to be noted that with respect to Examples 2 to 5, the same analysis was carried out, thereby determining the equilibrium viscosity.

TABLE 7

| | Glass material | | | Glass bead | | |
|---|---|---|---|---|---|---|
| | I | II | III | I | II | III |
| A | −22.40 | −0.26 | −2.59 | −1.33 | −1.05 | −0.49 |
| B | 41374.00 | 4214.90 | 7065.46 | 4089.00 | 3639.99 | 2548.33 |
| $T_0$ | −527.30 | 279.15 | 90.34 | 248.10 | 258.99 | 255.77 |

[Preparation of Glass Molded Body]

Each of the glass molded bodies of Examples 1 to 5 was prepared through steps of (1) preparation of glass material, (2) grinding treatment of end surface of the glass material, (3) placement, (4) preheating, (5) molding, (6) annealing, and (7) molded body discharge.

Example 1

(1) Preparation of Glass Material

A 0.5 mm-thick plate-like glass having a softening point of about 853° C., an annealing point of about 635° C., and a strain point of about 588° C. was prepared, and corner portions of its main surface of 148×78 mm were processed in an R-shape, thereby preparing a glass material I. It is to be noted that the above-described main surface was formed to have a size such that the first region and the second region provided on the outer edge of the first region of the finally obtained glass molded body I had desired sizes.

As the glass bead as the buffer material, a glass bead I having a softening point of about 704° C., an annealing point of about 533° C., and a strain point of about 506° C. was used.

(2) Grinding Treatment of End Surface

Thereafter, the glass material I was subjected to C chamfering in a size of 0.2 mm from the end surface of the glass over the whole circumference. The chamfering was performed with a grindstone No. 600 (available from Tokyo Diamond Tools Mfg. Co., Ltd.), the number of rotations of the grindstone was 6,500 rpm, and a moving speed of the grindstone was 5,000 mm/min. According to this, the surface roughness of the end surface became 450 nm.

(3) Placement

The mold 10 including the auxiliary mold 11, positioning plate 12, and the master mold 13, as illustrated in FIG. 9A, was used. The master mold 13 included the inner mold 15 and the outer mold 16; the flat portion master mold molding surface 151 of the inner mold 15 was flat; and the first and second bent portion master mold, molding surfaces 162 and 163 of the outer mold 16 were designed such that a hem surface having a radius of curvature of 5.0 mm, a bending angle of 87°, and a bending depth of 3.0 mm could be molded in the second region of the finally obtained glass molded body I. Carbon was used as the material of the mold 10. As illustrated in FIG. 9A, following the positioning plate 12, the placement was made such that in the main surface of the glass material I having been subjected to end surface processing, the second main surface 1B finally serving as the first region came into contact with the inner mold 15.

(4) Preheating

After the placement, the glass material I and the whole of the mold 10 were subjected to preheating, deformation, and annealing within the molding apparatus 20. In the used molding apparatus 20, the preheating zone had the first, second, third, and fourth preheating zones 22, 23, 24, and 25, the molding zone had the first and second molding zones 26 and 27, and the annealing zone had the first and second annealing zones 28 and 29.

In the first preheating zone 22, the glass material I and the whole of the mold 10 were subjected to temperature rise from room temperature to 476° C. such that the equilibrium viscosity of a site serving as the second region reached $10^{18}$ Pa·s within 2 minutes. Subsequently, the mold 10 having the glass material I placed thereon was transported into the second to fourth preheating zones 23 to 25 and subjected to temperature rise for 6 minutes to 670° C. at which the equilibrium viscosity of the site serving as the second region reached $10^{11}$ Pa·s which made the site serving as the second region moldable. It is to be noted that at this time, the glass bead I had a temperature of 669° C. and an equilibrium viscosity of $10^{7.4}$ Pa·s; and that the site corresponding to the first region in the glass material I had a temperature of 683° C. and an equilibrium viscosity of $10^{11}$ Pa·s.

(5) Molding

The glass material I in which preheating had been completed in the fourth preheating zone 25 and the whole of the mold 10 were transported into the first molding zone 26. In the first molding zone 26, the auxiliary mold 11 was pressed under 630 N at maximum with the pressing member 32 while maintaining the equilibrium viscosity of the site serving as the second region of the glass material I at $10^{11}$ to $10^{12}$ Pa·s. Subsequently, the resultant was transported into the second molding zone 27, and furthermore, the auxiliary mold 11 was pressed under 1,500 N at maximum with the pressing member 32. On this occasion, the glass bead I caused plastic deformation, and molding was carried out until the inner mold 15 was accommodated in the accommodating concave portion 164.

(6) Annealing

The glass material I in which the molding step was completed in the first molding zone 26 and the whole of the mold 10 were transported into the first annealing zone 28, and annealing was carried out such that the equilibrium viscosity of the site serving as the first region reached $10^{21}$ Pa·s within 4 minutes. Thereafter, the glass material I and the whole of the mold 10 were transported into the second annealing zone 29 and then allowed to stand for cooling to room temperature.

(7) Molded Body Discharge

The mold 10 after completion of annealing was disassembled, and a glass molded body I obtained by molding the glass material I in the above-described step was discharged. The obtained glass molded body I included the flat portion 2 as the first region and, on the outer periphery of the flat portion 2, the first and second bent portions 3 and 4 as the second region, having a radius of curvature of 5.0 mm, a bending angle of 87°, and a bending depth of 3.0 mm, as illustrated in FIGS. 1A to 1C.

Example 2

(1) Preparation of Glass Material

A 0.5 mm-thick plate-like glass having a softening point of about 821° C., an annealing point of about 606° C., and a strain point of about 556° C. was prepared, and corner portions of its main surface of 148×78 mm were processed in an R-shape, thereby preparing a glass material II. It is to be noted that the above-described main surface was formed to have a size such that the first region and the second region provided on the outer edge of the first region of a finally obtained glass molded body II had desired sizes.

As the glass bead as the buffer material, a glass bead II having a softening point of about 677° C., an annealing point of about 518° C., and a strain point of about 493° C. was used.

The grinding treatment of end surface (2) and the placement (3) were performed in the same manners as in Example 1.

(4) Preheating

The used molding apparatus 20 was the same as in Example 1.

In the first preheating zone 22, the glass material II and the whole of the mold 10 were subjected to temperature rise from room temperature to 483° C. such that the equilibrium viscosity of a site serving as the second region reached $10^{19}$ Pa·s within 2 minutes. Subsequently, the mold 10 having the glass material II placed thereon was transported into the second to fourth preheating zones 23 to 25 and subjected to temperature rise for 6 minutes to 667° C. at which the equilibrium viscosity of the site serving as the second region reached $10^{10}$ Pa·s which made the site serving as the second region moldable. It is to be noted that at this time, the glass bead II had a temperature of 692° C. and an equilibrium viscosity of $10^{6.4}$ Pa·s; and that the site corresponding to the first region in the glass material II had a temperature of 671° C. and an equilibrium viscosity of $10^{10}$ Pa·s.

(5) Molding

The glass material II in which preheating had been completed in the fourth preheating zone 25 and the whole of the mold 10 were transported into the first molding zone 26. In the first molding zone 26, the auxiliary mold 11 was pressed under 630 N at maximum with the pressing member 32 while maintaining the equilibrium viscosity of the site serving as the second region of the glass material II at $10^{10}$ to $10^{11}$ Pa·s.

Subsequently, the resultant was transported into the second molding zone 27, and furthermore, the auxiliary mold 11 was pressed under 1,500 N at maximum with the pressing member 32. On this occasion, the glass bead II caused plastic deformation, and molding was carried out until the inner mold 15 was accommodated in the accommodating concave portion 164.

(6) Annealing

The glass material II in which the molding step was completed in the first molding zone 26 and the whole of the mold 10 were transported into the first annealing zone 28, and annealing was carried out such that the equilibrium viscosity of the site serving as the second region reached $10^{38}$ Pa·s within 4 minutes. Thereafter, the glass material II and the whole of the mold 10 were transported into the second annealing zone 29 and then allowed to stand for cooling to room temperature.

(7) Molded Body Discharge

The mold 10 after completion of annealing was disassembled, and a glass molded body II obtained by molding the glass material II in the above-described step was discharged. The obtained glass molded body 11 included the flat portion 2 as the first region and, on the outer periphery of the flat portion 2, the first and second bent portions 3 and 4 as the second region, having a radius of curvature of 5.0 mm, a bending angle of 87°, and a bending depth of 3.0 mm, as illustrated in FIGS. 1A to 1C.

Example 3

(1) Preparation of Glass Material

A 0.5 mm-thick plate-like glass having a softening point of about 780° C., an annealing point of about 547° C., and a strain point of about 501° C. was prepared, and corner portions of its main surface of 148×78 mm were processed in an R-shape, thereby preparing a glass material III.

As the glass bead as the buffer material, the glass bead II which was the same as in Example 2, having a softening point of about 677° C., an annealing point of about 518° C., and a strain point of about 493° C. was used.

The grinding treatment of end surface (2) and the placement (3) were performed in the same manners as in Example 1.

(4) Preheating

The used molding apparatus 20 was the same as in Example 1.

In the first preheating zone 22, the glass material III and the whole of the mold 10 were subjected to temperature rise from room temperature to 495° C. such that the equilibrium viscosity of a site serving as the second region reached $10^{14}$ Pa·s within 2 minutes. Subsequently, the mold 10 having the glass material III placed thereon was transported into the second to fourth preheating zones 23 to 25 and subjected to temperature rise for 6 minutes to 675° C. at which the equilibrium viscosity of the site serving as the second region reached $10^9$ Pa·s which made the site serving as the second region moldable. It is to be noted that at this time, the glass bead II had a temperature of 686° C. and an equilibrium viscosity of $10^{6.5}$ Pa·s; and that the site corresponding to the first region in the glass material III had a temperature of 687° C. and an equilibrium viscosity of $10^8$ Pa·s.

(5) Molding

The glass material III in which preheating had been completed in the fourth preheating zone 25 and the whole of the mold 10 were transported into the first molding zone 26. In the first molding zone 26, the auxiliary mold 11 was pressed under 630 N at maximum with the pressing member 32 while maintaining the equilibrium viscosity of the site serving as the second region of the glass material III at $10^9$ to $10^{10}$ Pa·s. Subsequently, the resultant was transported into the second molding zone 27, and furthermore, the auxiliary mold 11 was pressed under 1,500 N at maximum with the pressing member 32. On this occasion, the glass bead II caused plastic deformation, and molding was carried out until the inner mold 15 was accommodated in the accommodating concave portion 164.

(6) Annealing

The glass material III in which the molding step was completed in the first molding zone 26 and the whole of the mold 10 were transported into the first annealing zone 28, and annealing was carried out such that the equilibrium viscosity of the site serving as the second region reached $10^{16}$ Pa·s within 4 minutes. Thereafter, the glass material III and the whole of the mold 10 were transported into the second annealing zone 29 and then allowed to stand for cooling to room temperature.

(7) Molded Body Discharge

The mold 10 after completion of annealing was disassembled, and a glass molded body III obtained by molding the glass material III in the above-described step was discharged. The obtained glass molded body III included the flat portion 2 as the first region and, on the outer periphery of the flat portion 2, the first and second bent portions 3 and 4 as the second region, having a radius of curvature of 5.0 mm, a bending angle of 87°, and a bending depth of 3.0 mm, as illustrated in FIGS. 1A to 1C.

Example 4

(1) Preparation of Glass Material

Similar to Example 3, a 0.5 mm-thick plate-like glass having a softening point of about 780° C., an annealing point of about 547° C., and a strain point of about 501° C. was prepared, and corner portions of its main surface of 148×78 mm were processed in an R-shape, thereby preparing a glass material III.

As the glass bead as the buffer material, a glass bead III having a softening point of about 569° C., an annealing point of about 445° C., and a strain point of about 426° C. was used.

The grinding treatment of end surface (2) and the placement (3) were performed in the same manners as in Example 1.

The molding apparatus 20 used in the preheating (4), the molding (5), and the annealing (6) was the same as in Example 1, and the temperature history at the time of preheating was the same as in Example 3.

(7) Molded Body Discharge

The mold 10 after completion of annealing was disassembled, and a glass molded body IV obtained by molding the glass material III in the above-described step was discharged. The obtained glass molded body IV included the flat portion 2 as the first region and, on the outer periphery of the flat portion 2, the first and second bent portions 3 and 4 as the second region, having a radius of curvature of 5.0 mm, a bending angle of 87°, and a bending depth of 3.0 mm, as illustrated in FIGS. 1A to 1C.

(8) Chemical Strengthening

The glass molded body IV was dipped for 2 hours in sodium nitrate which had been heated for melting at 450° C., thereby undergoing an ion exchange treatment. Thereafter, the glass molded body IV was lifted up from the molten salt and annealed to room temperature for 1 hour, and a deposited salt which was formed through solidification of the molten salt was washed away with water, followed by drying. Thereafter, the glass molded body IV was dipped for 1.5 hours in potassium nitrate which had been heated for melting at 425° C., thereby undergoing an ion exchange treatment. Thereafter, again, the glass molded body IV was lifted up from the molten salt, annealed to room temperature for 1 hour, and then washed away with water, followed by drying. The glass molded body IV had a surface compressive stress of 900 MPa and a depth of surface compressive stress (DOL) of 130 μm.

Example 5

(1) Preparation of Glass Material

Similar to Example 3, a 0.5 mm-thick plate-like glass having a softening point of about 780° C., an annealing point of about 547° C., and a strain point of about 501° C. was prepared, and corner portions of its main surface of 148×78 mm were processed in an R-shape, thereby preparing a glass material III.

As the glass bead as the buffer material, the glass bead III which was the same as in Example 4, having a softening point of about 569° C., an annealing point of about 445° C., and a strain point of about 426° C. was used.

The grinding treatment of end surface (2) and the placement (3) were performed in the same manners as in Example 1.

(4) Preheating

The used molding apparatus 20 was the same as in Example 1.

In the first preheating zone 22, the glass material III and the whole of the mold 10 were subjected to temperature rise from room temperature to 418° C. such that the equilibrium viscosity of a site serving as the second region reached $10^{18}$ Pa·s within 2 minutes. Subsequently, the mold 10 having the glass material III placed thereon was transported into the second to fourth preheating zones 23 to 25 and subjected to temperature rise for 6 minutes to 600° C. at which the equilibrium viscosity of the site serving as the second region reached $10^{10}$ Pa·s which made the site serving as the second region moldable. It is to be noted that at this time, the glass bead III had a temperature of 576° C. and an equilibrium viscosity of $10^{6.5}$ Pa·s; and that the site corresponding to the first region in the glass material III had a temperature of 617° C. and an equilibrium viscosity of $10^{10}$ Pa·s.

(5) Molding

The glass material III in which preheating had been completed in the fourth preheating zone 25 and the whole of the mold 10 were transported into the first molding zone 26. In the first molding zone 26, the auxiliary mold 11 was pressed under 630 N at maximum with the pressing member 32 while maintaining the equilibrium viscosity of the site serving as the second region of the glass material III at $10^{10}$ to $10^{11}$ Pa·s. Subsequently, the resultant was transported into the second molding zone 27, and furthermore, the auxiliary mold 11 was pressed under 1,500 N at maximum with the pressing member 32. On this occasion, the glass bead III caused plastic deformation, and molding was carried out until the inner mold 15 was accommodated in the accommodating concave portion 164.

(6) Annealing

The glass material III in which the molding step was completed in the first molding zone 26 and the whole of the mold 10 were transported into the first annealing zone 28, and annealing was carried out such that the equilibrium viscosity of the site serving as the second region reached $10^{25}$ Pa·s within 4 minutes. Thereafter, the glass material III and the whole of the mold 10 were transported into the second annealing zone 29 and then allowed to stand for cooling to room temperature.

(7) Molded Body Discharge

The mold 10 after completion of annealing was disassembled, and a glass molded body V obtained by molding the glass material III in the above-described step was discharged. The obtained glass molded body V included the flat portion 2 as the first region and, on the outer periphery of the flat portion 2, the first and second bent portions 3 and 4 as the second region, having a radius of curvature of 5.0 mm, a bending angle of 87°, and a bending depth of 3.0 mm, as illustrated in FIGS. 1A to 1C.

Example 6

A commercially available smartphone equipped with a cover glass having a curved surface on a display surface thereof was procured, and the cover glass was removed, to prepare a molded body VI. The obtained glass molded body VI included the flat portion 2 of 64 mm×146 mm as the first region; and on the outer periphery of the flat portion 2, the first and second bent portions 3 and 4 as the second region, having a radius of curvature of 4 mm, a bending angle of 76°, and a bending depth of 2.3 mm in the short-axis direction, and a radius of curvature of 10 mm, a bending angle of 89°, and a bending depth of 0.3 mm in the long-axis direction, as illustrated in FIGS. 1A to 1C. It is to be noted that the molded body VI was one having been subjected to a chemical strengthening treatment.

[Evaluation: Stress Integral Value S in the Plate Thickness Direction]

The stress integral value S in the plate thickness direction was measured using a birefringence measurement system (WPA-100, available from Photonic Lattice, Inc.). As illustrated in FIG. 2, a measurement range of the stress integral value S in the plate thickness direction was set on a line segment A joining a point (M/4,0) and a point (−M/4,0) and on a line segment B joining a point (0,N/4) and a point (0,−N/4). The center of gravity existent in the flat portion 2 as the first region was defined as a central point (m,n)=(0,0), and in a top view of the molded body seen from the second main surface 1B side, a long-side direction passing through the central point was defined as an m-axis, and a short-side direction orthogonal to the m-axis was defined an n-axis. With respect to the molded bodies I to V, a range of from (m,n)=(37 mm, 0 mm) to (m,n)=(−37 mm, 0 mm) in the m-axis direction and a range of from (m,n)=(0 mm, 20 mm) to (m,n)=(0 mm, −20 mm) in the n-axis direction were measured on the basis of the dimensions of each of the long side and the short side. With respect to the molded body VI, a range of from (m,n)=(38 mm, 0 mm) to (m,n)=(−38 mm, 0 mm) in the m-axis direction and a range of from (m,n)=(0 mm, 18 mm) to (m,n)=(0 mm, −18 mm) in the n-axis direction were measured.

[Evaluation: Shape Error Quantity and Flatness]

The shape error quantity and the flatness were measured using a three-dimensional measurement system ATOS, available from GOM (model number: ATOS Triple Scan III). As for the shape error quantity, a deviation value from the glass design, such as dimensions on design, was expressed in terms of a PV value. As for the flatness, a virtual plane was approximately prepared based on the design value on the basis of the first region of a molded article on the ATOS, and a deviation quantity of the first region relative to this virtual plane was expressed in terms of a PV value. With respect to the glass molded body VI, since the design shape and the molding method were unknown, the shape error quantity was not evaluated.

Figure 13:
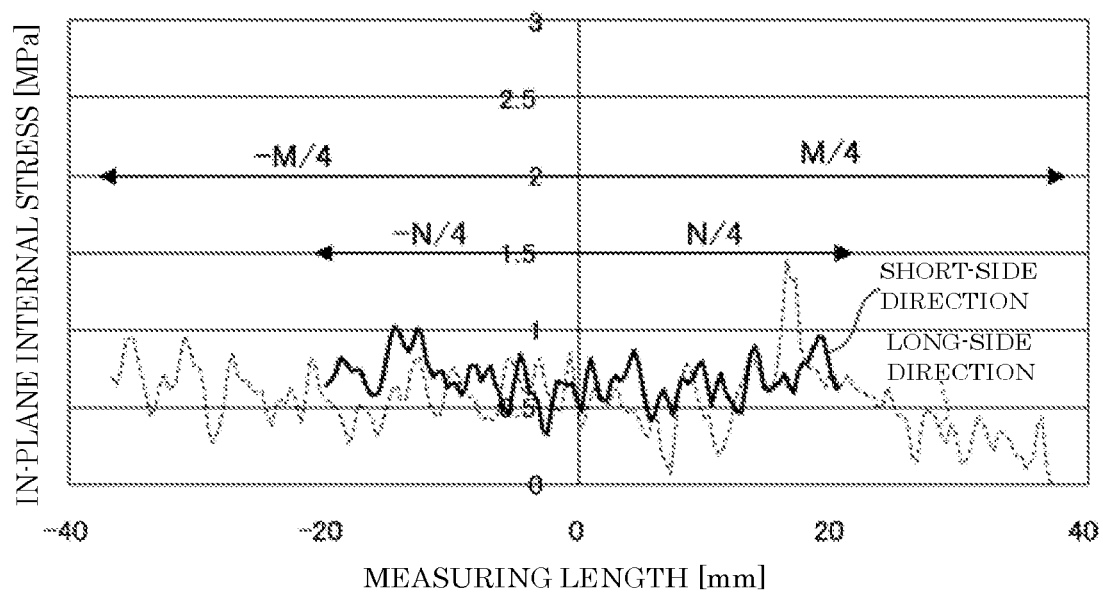
FIG. 13 is a graph showing measurement results of a stress integral value S in the plate thickness direction of a molded body II obtained in Example 2 of the section of Examples.
Figure 14:
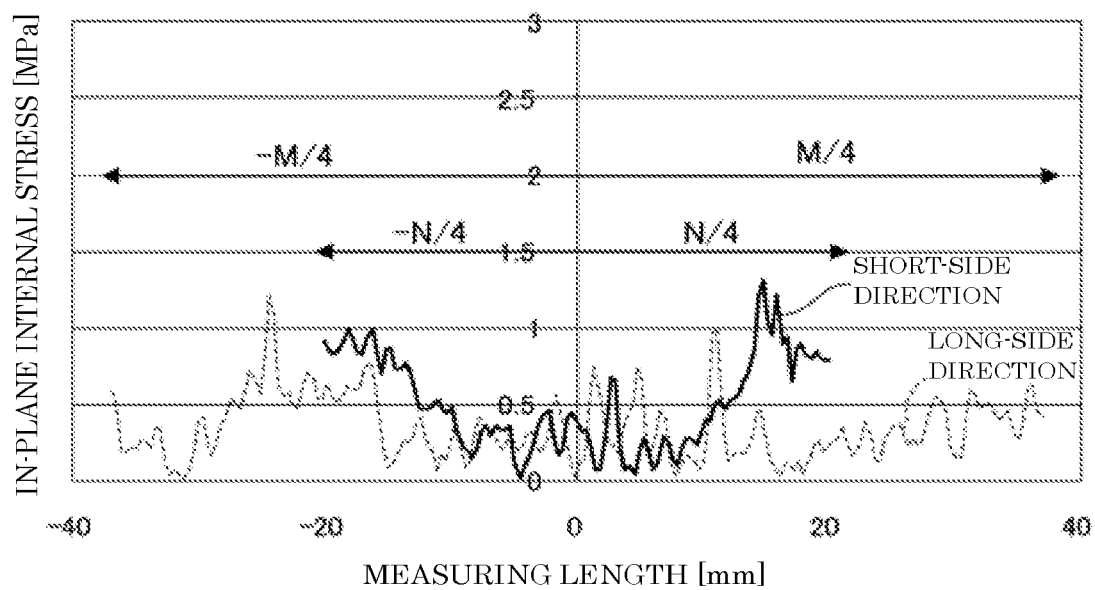
FIG. 14 is a graph showing measurement results of a stress integral value S in the plate thickness direction of a molded body III obtained in Example 3 of the section of Examples.
Figure 15:
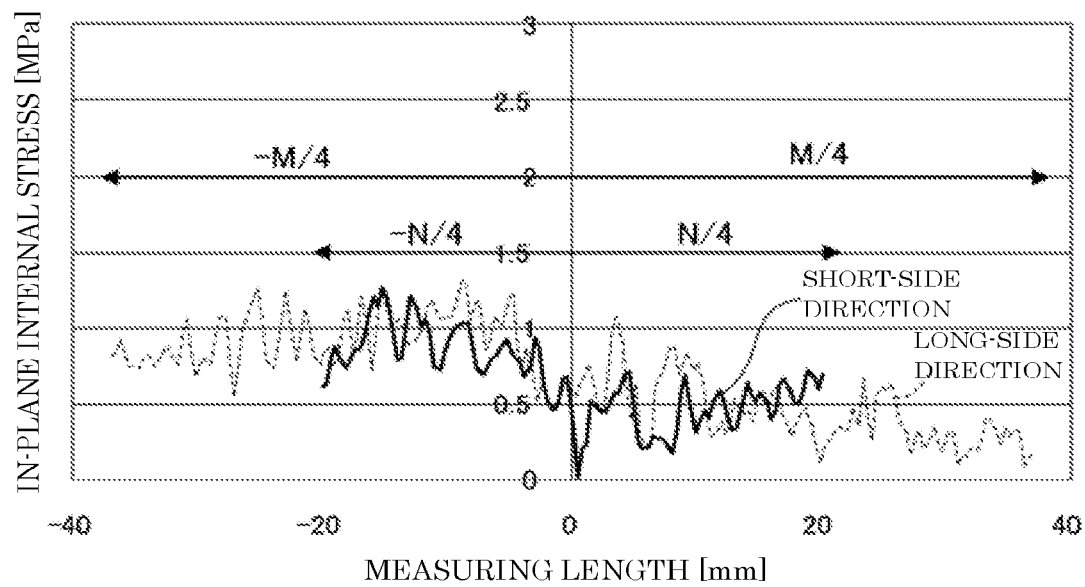
FIG. 15 is a graph showing measurement results of a stress integral value S in the plate thickness direction of a molded body IV obtained in Example 4 of the section of Examples.
Figure 16:
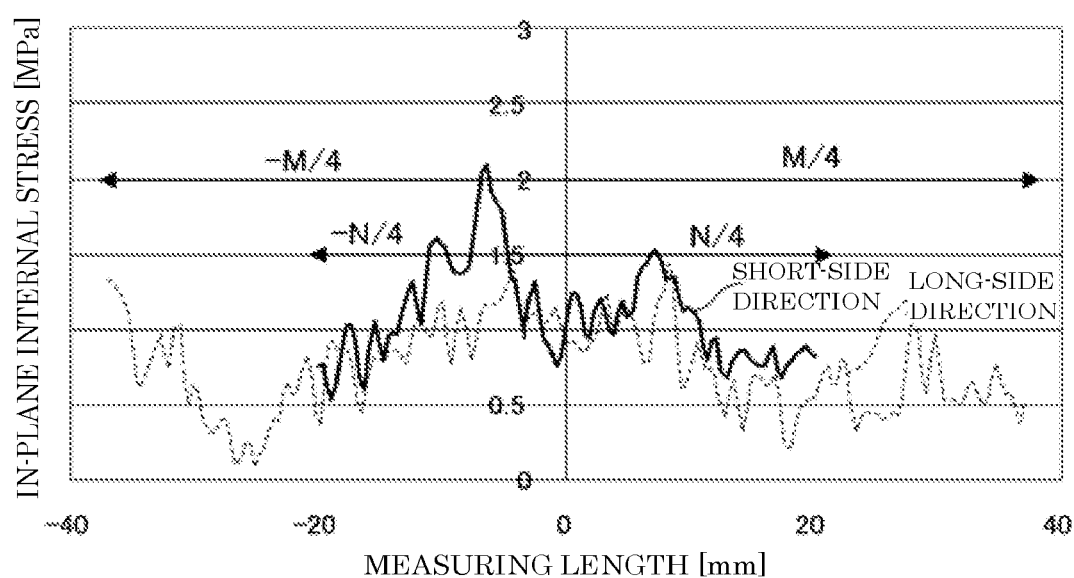
FIG. 16 is a graph showing measurement results of a stress integral value S in the plate thickness direction of a molded body V obtained in Example 5 of the section of Examples.
Figure 17:
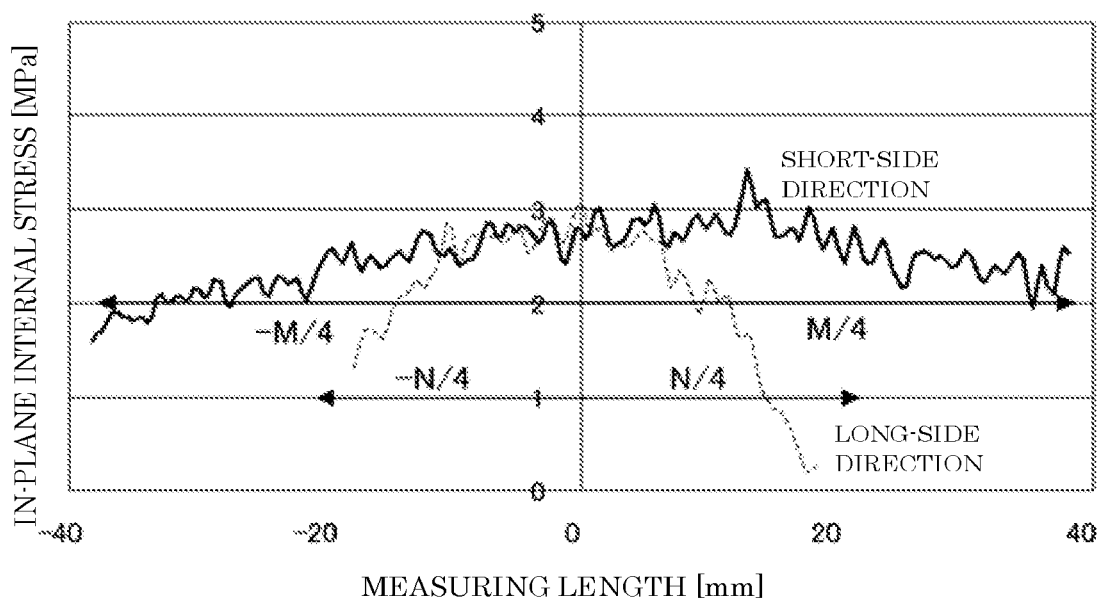
FIG. 17 is a graph showing measurement results of a stress integral value S in the plate thickness direction of a molded body VI obtained in Example 6 of the section of Examples.

With respect to each of the glass molded bodies i to VI obtained in Examples 1 to 6, the stress integral value S in the plate thickness direction was measured. The results of the molded body I are shown in FIG. 11; the results of the molded body II are shown in FIG. 13; the results of the molded body III are shown in FIG. 14; the results of the molded body IV are shown in FIG. 15; the results of the molded body V are shown in FIG. 16; and the results of the molded body VI are shown in FIG. 17.

From the obtained measurement results, the maximum values of the stress integral value S in the plate thickness direction are read, and the results thereof are shown in Table 8. As shown in Table 8, the maximum values of the stress integral value S in the plate thickness direction of the molded bodies I to V were 3.0 MPa or less. From those results, it was noted that the generation of a wrinkle in the first region can be reduced. On the other hand, in view of the fact that the stress integral value S in the plate thickness direction of the molded body VI is more than 3 MPa, it was noted that a wrinkle is generated in the vicinities of the four corners in the first region.

Furthermore, the stress integral value S in the plate thickness direction of each of the molded bodies I to IV was less than 2 MPa. As for this matter, it may be considered that a difference (viscosity ratio; $\log_{10}(\eta/\eta_0)$) from the viscosity ($\log \eta_0$ (Pa·s)) of the buffer material at the temperature of the annealing point of the molding material ($\log \eta=12$ (Pa·s)) is less than 4.5, and the buffer material is crushed before an excessive press pressure is generated within the plane of the molded body, and therefore, the stress integral value S in the plate thickness direction became small.

With respect to each of the glass molded bodies I to V obtained in Examples 1 to 5, the shape error quantity was measured, and the evaluation results thereof are shown in Table 8. In all of the glass molded bodies I to V, the shape error quantity was 0.4 mm or less. From those results, it was noted that when installing into a casing of a smartphone, etc., a gap quantity from the casing became small, thereby bringing about an effect for improving the strength at the time of falling. Furthermore, with respect to the molded bodies I to III and V, the shape error quantity was less than 0.2 mm. As for this matter, it may be considered that when performing molding while pressing the first region of the glass molded body with the master mold and the inner mold, it was possible to form the bent shape of the second region while keeping the flatness of the glass molded body. Furthermore, it was noted that an effect for making the removal amount at the time of polishing step uniform within the plane is brought.

With respect to each of the glass molded bodies I to VI obtained in Examples 1 to 6, the flatness of the first region was measured, and the evaluation results thereof are shown in Table 8. As shown in Table 8, the flatness of the molded bodies I to V was less than 0.2 mm. Furthermore, with respect to the molded bodies i to III and V, the flatness was less than 0.15 mm. As for this matter, it may be considered that when performing molding while pressing the first region of the glass molded body with the master mold and the inner mold, the molding could be achieved while keeping the flatness of the glass molded body, and furthermore, an effect for making the removal amount within the plane at the time of surface polishing uniform was brought. In addition, with respect to the molded body IV, though the shape warpage of the first region of the glass molded body after the chemical strengthening was generated, the flatness was less than 0.2 mm, a level of which is not concerned. On the other hand, the flatness of the molded body VI was more than 0.2 mm, and it may be assumed that the shape warpage of the first region of the glass molded body after the chemical strengthening was generated, or the flatness of the glass molded body VI before the chemical strengthening was bad.

10: Mold
11: Auxiliary mold
13: Master mold
15: Inner mold
16: Outer mold
17: Glass bead (buffer material)
20: Molding apparatus
22 to 25: First to fourth preheating zones (preheating portions)
26 to 27: First to second molding zones (pressurizing portions)
114: Flat portion auxiliary mold molding surface (first region auxiliary mold molding surface)
115: First bent portion auxiliary mold molding surface (second region auxiliary mold molding surface)
116: Second bent portion auxiliary mold molding surface (second region auxiliary mold molding surface)
151: Flat portion master mold molding surface (first region master mold molding surface)
152: Buffer material pressurizing surface
162: First bent portion master mold molding surface (second region master mold molding surface)
163: Second bent portion master mold molding surface (second region master molding surface)
164: Accommodating concave portion

TABLE 8

| Molded body | Example 1 I | Example 2 II | Example 3 III | Example 4 IV | Example 5 V | Example 6 VI |
|---|---|---|---|---|---|---|
| Maximum value of stress integral value S in the plate thickness direction [MPa] | 1.2 | 1.5 | 1.3 | 1.3 | 2.1 | 3.4 |
| Average stress integral value S in the m-axis direction [MPa] | 1.0 | 1.5 | 1.2 | 1.3 | 1.4 | 3.4 |
| Average stress integral value S in the n-axis direction [MPa] | 1.2 | 1.0 | 1.3 | 1.3 | 2.1 | 3.1 |
| Shape error quantity [mm] | 0.15 | 0.13 | 0.11 | 0.31 | 0.15 | — |
| Flatness [mm] | 0.11 | 0.09 | 0.09 | 0.17 | 0.12 | 0.23 |
| Viscosity ratio $Log_{10}(\eta/\eta_0)$ | 3.76 | 3.56 | 1.4 | 1.4 | 4.7 | — |

It is to be noted that the viscosity ratio described in Table 8 means a difference $\log_{10}(\eta/\eta_0)$ from the viscosity of the buffer material (log $\eta_0$(Pa·s)) at the temperature of the annealing point of the molding material (log $\eta$=12 (Pa·s)).

In the light of the above, the molded bodies I to V prepared in Examples 1 to 5 had excellent properties such that the maximum value of the stress integral value S in the plate thickness direction is small, the shape error quantity is small, the flatness is excellent, and no wrinkle is generated.

The present application is based on Japanese patent application No. 2017-216459 filed on Nov. 9, 2017, and the contents of which are incorporated herein by reference.

DESCRIPTION OF REFERENCE NUMERALS AND SIGNS

1: Cover member (molded body)
1A: First main surface
1B: Second main surface
2: Flat portion (first region)
3: First bent portion (second region)
4: Second bent portion (second region)
5: Linear transfer portion 165: Bead-positioning portion (buffer material-positioning portion)
165A: Inner positioning concave portion
165B: Outer positioning concave portion
166: Through-hole
G: Glass material (molding material)

What is claimed is:

1. A molded body which is a plate-like molded body having a first region and a second region provided on an outer periphery of the first region,
wherein a radius of curvature of the second region is smaller than a radius of curvature of the first region, and
when a main surface of the molded body on the side of a direction where the second region is bent relative to the first region is defined as a first main surface, and a main surface on an opposite side thereto is defined as a second main surface, in a top view of the molded body seen from the second main surface side, in a case where a long-side direction of the molded body is defined as an m-axis, a short-side direction orthogonal to the m-axis is defined an n-axis, a center of gravity of the molded body is defined as a central point (m,n)=(0,0), a long-side dimension of the molded body is defined as M, and a short-side dimension of the molded body is defined as N, a stress integral value S in a plate thickness direction on a line segment A joining a point (M/4,0) and a point (−M/4,0) and a line segment B joining a point (0,N/4) and a point (0,−N/4) is 0.1 MPa or more and 3.0 MPa or less.

2. The molded body according to claim 1, wherein, in a case where a length of the first region in a short-axis direction is defined as L mm, and in the molded body, an arithmetic average roughness in a range of L/10 mm from an outer edge of the first region of the second main surface toward the central point is defined as $Ra_1$, and an arithmetic average roughness of the second region is defined as $Ra_2$, a relation of ($Ra_1/Ra_2>1.1$) is satisfied, and $Ra_2$ is less than 10 nm.

3. The molded body according to claim 1, wherein the molded body is a cover member for protecting an object to be protected.

4. The molded body according to claim 1, wherein the molded body is made of a glass.

* * * * *